United States Patent
Bermundo

(10) Patent No.: US 10,817,233 B2
(45) Date of Patent: Oct. 27, 2020

(54) PRINTING COMPUTING DEVICE FOR OPERATING A MULTI-FUNCTION PRINTING DEVICE

(71) Applicant: KYOCERA DOCUMENT SOLUTIONS, INC., Osaka (JP)

(72) Inventor: Neil-Paul Bermundo, Glendora, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 16/391,760

(22) Filed: Apr. 23, 2019

(65) Prior Publication Data

US 2019/0250863 A1    Aug. 15, 2019

Related U.S. Application Data

(63) Continuation-in-part of application No. 15/847,526, filed on Dec. 19, 2017, now Pat. No. 10,409,530.

(51) Int. Cl.
*G06F 3/12* (2006.01)
*H04N 1/00* (2006.01)

(52) U.S. Cl.
CPC .......... *G06F 3/1248* (2013.01); *G06F 3/123* (2013.01); *G06F 3/1206* (2013.01); *G06F 3/1226* (2013.01); *G06F 3/1296* (2013.01); *H04N 1/00278* (2013.01)

(58) Field of Classification Search
CPC .... G06F 3/1248; G06F 3/1206; G06F 3/1226; G06F 3/123; G06F 3/1293; G06F 3/1296; G06F 3/1298; H04N 1/00278
See application file for complete search history.

(56) References Cited

U.S. PATENT DOCUMENTS

| | | | | |
|---|---|---|---|---|
| 6,369,909 B1 ‡ | 4/2002 | Shima | ............ | G06F 3/1206 358/1 |
| 7,382,484 B2 ‡ | 6/2008 | Matsukubo | ............ | G06F 3/1213 358/1 |
| 7,706,017 B2 ‡ | 4/2010 | Ferlitsch | ............ | G06K 15/02 358/1 |
| 7,898,682 B2 ‡ | 3/2011 | Matsuo | ............ | G06K 15/02 358/1 |

(Continued)

OTHER PUBLICATIONS

Office Action and form 892 in corresponding U.S. Appl. No. 16/537,866 dated Nov. 29, 2019 (pp. 1-41).

*Primary Examiner* — Moustapha Diaby
(74) *Attorney, Agent, or Firm* — Millen, White, Zelano & Branigan, P.C.; William Nixon

(57) ABSTRACT

A printing computing device connects to a printing device using a fast data transfer connector to enable additional functionality and capabilities not offered by the printing device. The printing computing device connects to a network to receive print jobs from external devices within the network. The printing computing device processes the print jobs according to rules such that print jobs are processed accordingly. The printing computing device also includes firmware not available on the printing device such that print jobs not supported by the printing device still may be processed. The printing computing device also includes an engine that determines whether an incoming print job is a PDL print job or a command to perform a function not available on the printing device.

18 Claims, 15 Drawing Sheets

(56) References Cited

U.S. PATENT DOCUMENTS

| | | | | |
|---|---|---|---|---|
| 7,948,643 | B2 ‡ | 5/2011 | Aritomi | G06F 3/1203 358/1 |
| 8,286,097 | B2 ‡ | 10/2012 | Tanji | G06F 9/5038 715/84 |
| 9,424,668 | B1 * | 8/2016 | Petrou | G06T 11/206 |
| 2002/0012453 | A1 * | 1/2002 | Hashimoto | H04N 1/00236 382/112 |
| 2005/0063725 | A1 * | 3/2005 | Matsukura | G03G 15/80 399/88 |
| 2006/0244986 | A1 ‡ | 11/2006 | Ferlitsch | G06F 3/1204 358/1.13 |
| 2007/0070406 | A1 * | 3/2007 | Komine | G06F 3/1204 358/1.15 |
| 2008/0028387 | A1 * | 1/2008 | Nakagawa | G06F 8/65 717/172 |
| 2011/0225341 | A1 * | 9/2011 | Satoh | G06F 13/405 710/314 |
| 2012/0084767 | A1 | 4/2012 | Ishimoto | |
| 2012/0105905 | A1 | 5/2012 | Wei et al. | |
| 2013/0163014 | A1 * | 6/2013 | Xiao | G06F 3/1204 358/1.13 |
| 2014/0288761 | A1 ‡ | 9/2014 | Butler | G07C 5/0816 701/29.6 |
| 2014/0300921 | A1 ‡ | 10/2014 | Utoh | G06K 15/4055 358/1.14 |
| 2014/0333967 | A1 | 11/2014 | Ohkawa | |
| 2016/0283828 | A1 * | 9/2016 | Osadchyy | G06K 15/1805 |
| 2018/0088871 | A1 * | 3/2018 | Takamoto | G06F 3/123 |

\* cited by examiner
‡ imported from a related application

PRINTING COMPUTING DEVICE FOR OPERATING A MULTI-FUNCTION PRINTING DEVICE

FIELD OF THE INVENTION

The present invention relates to a portable device having a page description language and raster image processor system that connects to a multi-functional printing device to provide additional capabilities and functionalities.

DESCRIPTION OF THE RELATED ART

Printers and associated equipment may have slower upgrade cycles and retain legacy printer engines. The initial high costs of printer engines result in older printer engines being kept longer in offices even if not used. There is less demand for newer printer engines or other features. Further, several months may pass between product releases due to development issues in hardware or software. Moreover, the cost of fixing firmware issues or doing firmware upgrades may be costly. Not only in terms of hardware replacements or software updates, but also with technicians visiting the customers to perform these actions.

SUMMARY OF THE INVENTION

A printing computing device for printing documents from an external device at a printing device attached to a network is disclosed. The printing computing device includes a print job manager to schedule a print job received over the network. The printing computing device also includes an engine to determine whether the print job includes a command or a page description language (PDL) print job. The printing computing device also includes a raster image processing (RIP) firmware to process the PDL print job from the print job manager. The printing computing device also includes a communication layer to interface with the external device and the printing device. The printing computing device also includes a fast data transfer connector to connect to the printing device and to exchange data with the printing device. The engine performs a function within the printing computing device in response to the command.

A method for processing a print job at a printing computing device for a printing device also is disclosed. The printing computing device is connected to an external device through a network. The method includes determining whether a print job received from the external device includes a page description language (PDL) print job or a command using an engine. The method also includes performing a function within the printing computing device using the engine in response to the command. The method also includes processing the PDL print job using a raster image processing (RIP) firmware and a print job manager. The method also includes sending a result of the performing step or the processing step to the printing device using a fast data transfer connector to connect to the printing device.

A method for using a printing computing device with a printing device in a network having an external device to send print jobs to the printing device. The method includes receiving a print job at a print job manager within the printing computing device. The method also includes analyzing a header of the print job using an engine when scheduled by the print job manager. The method also includes determining whether the print job includes a command according to the header. The method also includes processing the command to determine a function to perform within the printing computing device. The method also includes performing the function within the printing computing device to generate a result. The method also includes sending the result to the printing device from the printing computing device using a fast data transfer connector to connect to the printing device. The result causes the printing device to print a document or upgrade firmware within the printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
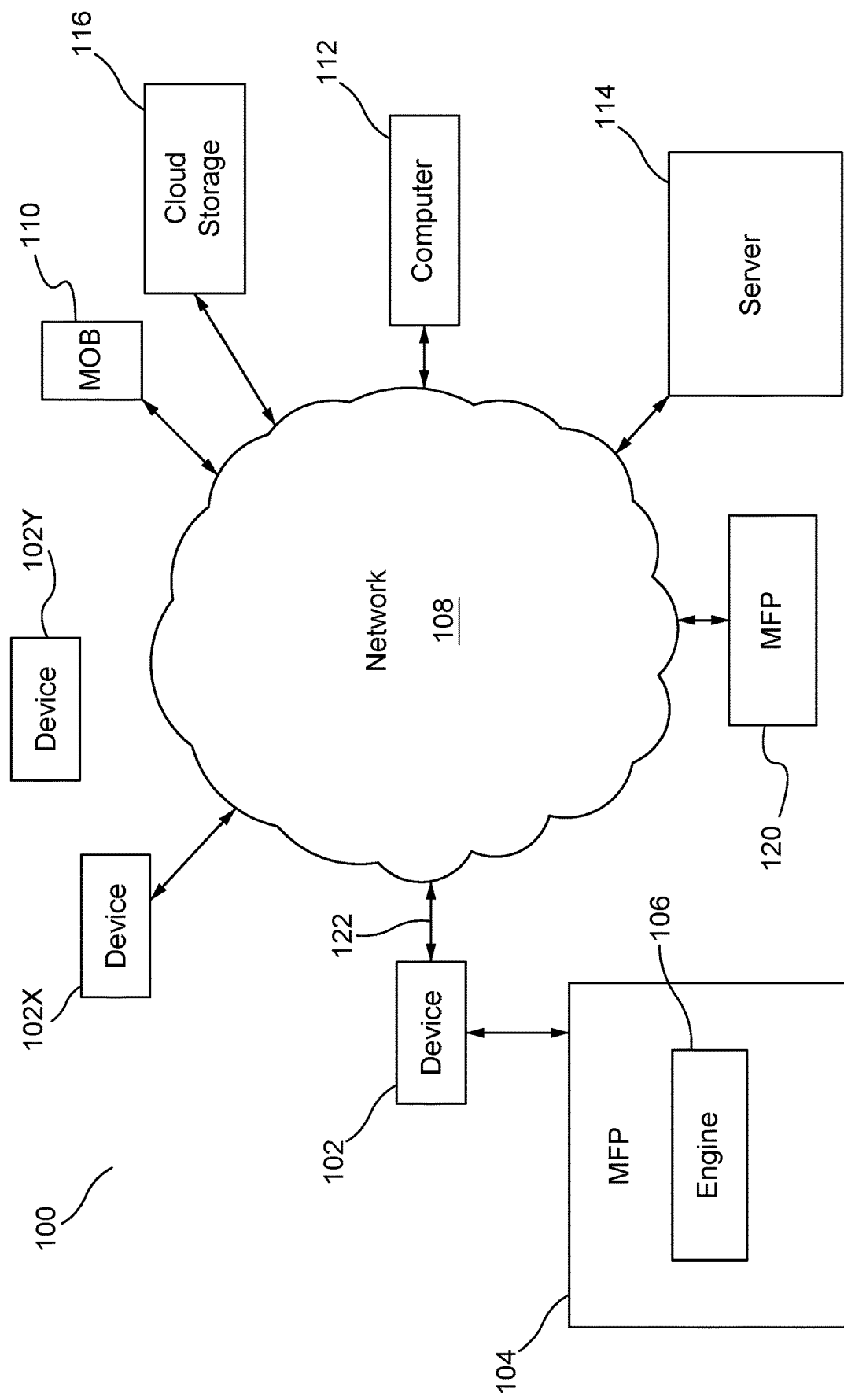
FIG. 1 illustrates a block diagram of a system for performing printing operations using a printing computing device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments include a printing computing device having a page description language (PDL) or raster image processor (RIP) system. The printing computing device may be an external computing device with a computer processing unit, a memory, and an operating system. The printing computing device also includes connectivity interfaces to connect to existing printer devices. It also implements networking capability to advertise itself as another printer device on a network.

The term of a printing computing device may refer to a portable device that is attached to a MFP or any other device having the features disclosed below. The term "printcast" also may be used when referring to the printing computing device. For example, the printing computing device also may be known as a printcast printing computing device, printcast device, or printcast computing device. These terms also may be used within the present specification to designate a portable device, such as a portable printing computing device or a portable printing computing system.

The disclosed printcast printing computing device supports connectivity interfaces with the MFP and new PDL technologies. It also receives firmware upgrades from servers for performing engine firmware upgrades or maintenance. When connected, the printcast printing computing device detects native PDLs supported in the printer device and provides a pass-through for those PDLs. The printcast printing computing device may translate unsupported PDL to native PDL, or basic raster formats, like JPEG/TIFF supported by the printer engine. This feature allows compatibility with any printer, even those from other manufacturers.

The printcast printing computing device also may override engine firmware components if the PDL RIP firmware in the device is more "up-to-date" and includes new features missing on the printer engine. It also helps test a firmware upgrade before it is installed as a final firmware upgrade to the engine. Dumb printers may be developed with the RIP override feature such that RIP functionality exists and operates externally of the printer. The printcast printing computing device also may host imaging applications that receive images or data from mobile applications, web applications, or desktop devices to print to the printer engine. The printcast printing computing device may register to enterprise printer management tools for device manageability.

In another embodiment, the print queue or printer driver, which normally has a printer port configured to point to an MFP or printer, may be configured to have a printer port that points, instead, to a printcast printing computing device. It is for technical accuracy to ensure that the disclosed embodiments support printing from the printer driver to the printcast device. A printer port, such as the one in a Windows™ Operating System, is managed by a port monitor and serves as a connection between the printer driver or print queue to a printer. The printer port also may be the means of connection between the printer driver or print queue and the printcast printing computing device. In this configuration, the printer driver, through the port configured as the IP address of the printcast printing computing device, may send the print driver generated print job to the networked printcast printing computing device. In the configuration, the user will be able to take advantage of the printer driver features and, at the same time, apply and take advantage of the printcast printing computing device features. This feature also implies that any printer driver may be pointed and associated with the networked printcast printing computing device.

The existing printer driver and its associated print queue can still be available for use as normal. In other words, if a user selects the print queue associated with the printer device, then the user will have the same printer features and capabilities as provided by the legacy printer engine and printer driver for the print queue. A print queue for the printcast printing computing device may appear as a new print queue to allow the new functionalities and capabilities to be added onto the legacy or third-party printer devices. If the user selects the printcast printing computing device print queue as the destination for a print job, then the new features that are not necessarily present or unsupported in the printer engine but supported by the printcast computing device will become available to the user. The user can access the new printer features that the printcast printing computing device can perform and print using the printer engine.

Definitions:

MFP—Multi-Function (or Functional) Printer or Printing Device.

PDL—Page Description Language, a type of programming language that describes the document or pages in a print job. Examples of PDLs are Printer Command Language (PCL) 5, PCLXL, or PCL 6, and PostScript. Portable Document Format (PDF) and XML Paper Specification (XPS) also belong to this group. Image formats, such as JPG and TIFF, which also can be printed, are special cases that are handled by the PDL.

RIP—Raster Image Processor, a firmware component that includes PDL interpreters. This feature is disclosed in greater detail below.

Print File, Print Job, or Test File—A computer file that contains PDL commands and is raw printable data for the MFP. A print job is the output of the printer driver. It is a binary representation in one of the PDL formats, such as PCL, PDF, or XPS.

Graphics Rendering Component—An internal component in the RIP firmware that translates the PDL commands or data into binary data that that MFP engine can understand. This is similar to machine language to which programming languages are translated so that computing devices can understand. The binary data is such that the Graphics Rendering Level will be understood by the hardware and converted to actual drawing or pixels on the paper. This component is disclosed in greater detail below.

GEU—Graphics Execution Unit, a hardware component at the engine that executes the Orderlist generated from the Graphics Rendering Component to create a raster representation of the print job or document.

Printer Driver—A device driver in Windows™ or other operating systems that translates a document into a print job.

Graphics Orderlist—A binary data representation to which PDL commands are translated by the Graphic Rendering Component. Graphics Orderlists are low-level graphics instructions that the MFP hardware understands and processes to translate to actual markings on a page. Like machine language for a computer, the Graphics Orderlist is a language that the MFP will understand.

Band Data—A row of binary data of results from the processing of the Graphics Orderlist. It appears like a pixmap or bitmap image representation of the page. A page consists of rows of band data. The size of each one may be the same, such as 128 bytes. In some embodiments, the height of each band may be dynamic. The width may be the width of the page to be rendered.

Dumb Printer—An idea of a printer engine that does not have RIP firmware. Raster image processing is performed external of the printer. The printer receives fully rendered pages in either graphics orderlist form or raster form (band data) that the printer engine can process for actual markings on the paper.

The disclosed embodiments add new PDL technologies to legacy or third-party MFPs. This feature will extend the life of older printer engines as opposed to placing the printer engines or MFPs into storage or the trash. Many companies hesitate to get rid of older printers and keep them. The printcast printing computing device allows one to keep and utilize the legacy printers. The disclosed embodiments also allow for the usage of third-party MFPs as part of the devices managed through the printcast printing device.

The disclosed printcast printing computing device also allow use of up-to-date RIP firmware to override legacy, older, or less-capable RIP firmware. This feature offers full RIP firmware functionality that can replace or override printer RIP firmware to utilize or configure dumb printers. The disclosed device also provides better performance than engine hardware components because portable computing devices would have up-to-date CPUs, more memory, and other components such as upgraded graphics processing units. It may add new capabilities like mobile application scan-to-print capabilities to regular printers (non-MFPs). The engine may be managed through information technology tools as opposed to hardware or software upgrades at the printer.

The portable printing technology embodied in the disclosed device may avoid several situations and problems for users of printers and MFPs. For example, engine issues would be by-passed when the MFP or printer engine includes obsolete firmware, a hardware bug, or a performance issue by printing through the printcast printing computing device disclosed herein. If a firmware upgrade needs to be done, the printcast printing computing device operating system or application can query or receive notification from the IT enterprise servers. Then, it can download the firmware and refresh the engine with the new firmware. This feature may save the company the cost of sending technicians to the field.

When an enterprise environment only has older or third-party engines, the disclosed printing device can translate new PDLs or file formats and download a backward compatible print job to the older and third-party engines, especially when a user desires to print with one of the new PDL formats. Older and less capable printers will have additional use through the new technologies that the printing device can provide. Engine firmware and hardware become old or obsolete. Better hardware and firmware components are developed. After a certain amount of time, legacy printers and systems are not even supported. New networking and printing software technologies are developed faster than the rate of printer firmware and hardware development. Companies rarely upgrade the older engines to have the newer technologies. For example, older printer engines may not support the latest printing platform or protocols. Using the disclosed printing device, the legacy or third-party engines would be available without the need for significant upgrades.

Because upgrades are provided through a portable device, a cheaper alternative is provided to users. The disclosed embodiments may be less costly than new MFP engine hardware. Enterprise management tools will be able to manage even the legacy and third-party MFPs as part of a common set of devices with similar capabilities and features with the technologies provided in the printcast printing computing device. By hosting applications in the device with wifi and networking capabilities, it is possible to enable cloud support on engines, without the need to add those features on the engine firmware.

FIG. 1 depicts a block diagram of a system 100 for performing printing operations using a printcast printing computing device 102 according to the disclosed embodiments. Hereafter, printcast printing computing device 102 also may be referred to as printing device 102, printcast device 102, computing device 102, or portable printing computing device 102. System 100 may be an example of network architecture to illustrate how printcast device 102 is used in conjunction with MFP 104. As shown, printcast device 102 is a separate component that may attach to MFP 104. Printcast device 102 may be a USB device to engage a USB port on MFP 104. Alternatively, printcast device 102 may be another device that connects in some manner with MFP 104.

Printcast device 102 also connects to network 108 to communicate with other components within system 100, such as mobile device 110, computer 112, or server 114. As can be appreciated, system 100 may include many additional components that send tasks to MFP 104. Mobile device 110 may be a handheld or portable computing device, such as a smartphone, that sends files for processing by MFP 104. For example, mobile device 110 may send pictures to be printed on MFP 104. Computer 112 may be a desktop or laptop computer connected to network 108 to also utilize MFP 104. Server 114 may be a data storage device that provides upgrades to MFP 104. These upgrades may be software upgrades, updates or patches for software or firmware components on MFP 104. Server 114 also may communicate with printcast device 102. Printcast device 102 and MFP 104 may send information to server 114 for storage. Mobile device 110, computer 112, and server 114 may run applications internally to perform printing and scanning operations. Cloud storage 116 may be internet or cloud based storage location.

Printcast device 102 connects directly to engine 106 of MFP 104. It provides all of the new technologies such as new PDLs and mobile applications to be available for engine 106 and the users of MFP 104. As noted above, printcast device 102 may be a separate computing device that is attached to MFP 104. As a computing device with networking connectivity, printcast device 102 also may be organized as a cluster fleet of cooperating devices to make available new technologies throughout network 108, including support for older and third-party engines. Printcast device 102 may receive print job parts from other portable printing computing devices, such as printcast devices 102X and 102Y, or printers, such as MFP 120, for remote processing. This feature assists busy printer engines or busy portable printing devices.

In this scenario, existing printers will continue to receive print jobs from network 108 from many users. More users may be sending tasks to the same printing device, thereby making it a bottleneck for printing. Printcast printing computing device 102 would be so busy that it will not be able to immediately send jobs to connected printer engine 106. In some embodiments, it is possible to send the job to one or more printcast printing computing devices for remote processing. The job is returned to the originating printcast device. The print job would be pre-processed or pre-rendered. Users will not have to wait longer to receive the printouts. Printcast device 102 includes the capability to divide and distribute complex print jobs with other printcast printing computing devices.

Printcast device 102 supports various connectivity features as an external but portable software, firmware, or device. The connectivity features include, but are not limited to, wifi, local area networks, NFC, parallel port, serial port, USB printer port, USB data port, Bluetooth, internet and the like. Further connectivity features to a printer, computer, both wireless and wired, can be added, integrated, and supported.

Input data for printcast device 102 may be received from a connection 122, which may be wireless. For example, if printcast device 102 is a USB computing device, then the data would come through wireless or wired connection 122 connected to network 108. If printcast device 102 is a mobile computer, then data may come through input ports connected through a wireless or wired connection 122. Printcast device 102 also generates output data through its various connectivity ports. The connectivity ports may be a USB data port, a USB printer port, wifi, NFC, Bluetooth, TCP/IP, and the like. Printcast device 102 may connect to any input ports in MFP 104 and also may include wired, wireless, or direct connections.

Printcast device 102 may be a USB computing device, an HDMI computing device, a Blackberry Pi device, a personal computer, a mobile or smartphone device, a tablet, a mini personal computer, and the like. In some embodiments, it may be possible to integrate printcast device 102 inside MFP 104 because the printing device includes functions that can be implemented entirely in software or firmware. Printcast device 102 may be MFP firmware component or an application residing and hosted in a flash memory area. The behavior of a locally hosted application or firmware component may function like printcast device 102, disclosed below, as long as it is upgradeable and provides the features disclosed below. The capabilities that the disclosed embodiments are aiming to provide can all be performed in any computing device that can be connected either by wire or wirelessly to any imaging device like MFP 104 or a printer engine.

Figure 2:
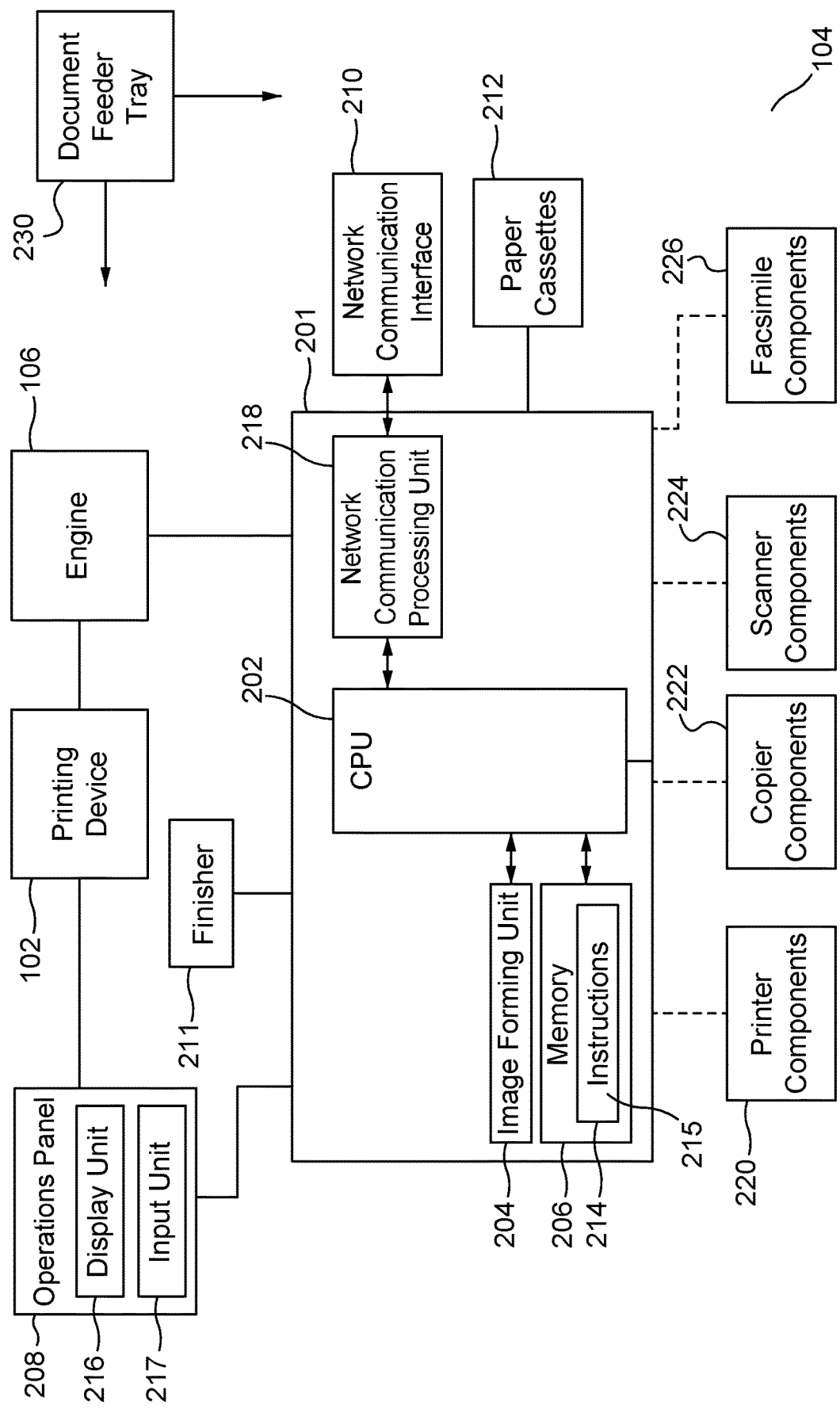
FIG. 2 illustrates a block diagram of components of the MFP used in conjunction with the printing computing device according to the disclosed embodiments.

An example of MFP 104 architecture may be shown in FIG. 2. The architecture shown in FIG. 2 may apply to any multi-functional printer or image forming apparatus that scans documents to perform other functions, such as printing, storing, copying, and the like. Printcast device 102, as shown, is connected to engine 106, which, in turn, is connected to the other components of MFP 104.

MFP 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. MFP 104, using computing platform 201, may be configured to perform various operations, such as scanning, copying, printing, receiving or sending a facsimile, or document processing. As such, MFP 104 may be a printing device or a multi-function peripheral including a scanner, and one or more functions of a copier, a facsimile device, and a printer. To provide these functions, MFP 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

MFP 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of MFP 104 to receive papers and documents to be processed. A document is placed on or in document processor input feeder tray 230, which moves the document to other components within MFP 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with MFP 104, such as any processors within components 220, 222, 224, or 226. Memory unit 206 also may store information for various programs and applications, as well as data specific to MFP 104. For example, a storage location 214 may include data for running an operating system executed by computing platform 201 to support the components within MFP 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause MFP 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors cause MFP 104 to act as a printer, copier, scanner, and a facsimile device.

MFP 104 also includes an operations panel 208, which may be connected to computing platform 201. Operations panel 208 may include a display unit 216 and an input unit 217 for facilitating interaction with a user to provide commands to MFP 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Input unit 217 includes a touch-screen digitizer overlaid onto display unit 216 that senses touch to receive inputs from the user. By this manner, the user interacts with display unit 216. Printcast device 102 may be connected via operations panel 208 to engine 106.

MFP 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on MFP 104. CPU 202 also may retrieve information stored in memory unit 206, such as settings for MFP 104.

MFP 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from printcast device 102.

Engine 106 manages and operates the low-level mechanism of the MFP engine, such as hardware components that actuate placement of toner onto paper. Engine firmware 106 may manage and coordinate the half-toner, toner cartridges, rollers, schedulers, storage, input/output operations, and the like. The raster image processor (RIP) firmware that interprets the page description languages (PDLs) would transmit and send instructions down to the lower-level engine 106 for actual rendering of an image and application of the toner onto paper during operations on MFP 104.

Figure 3:
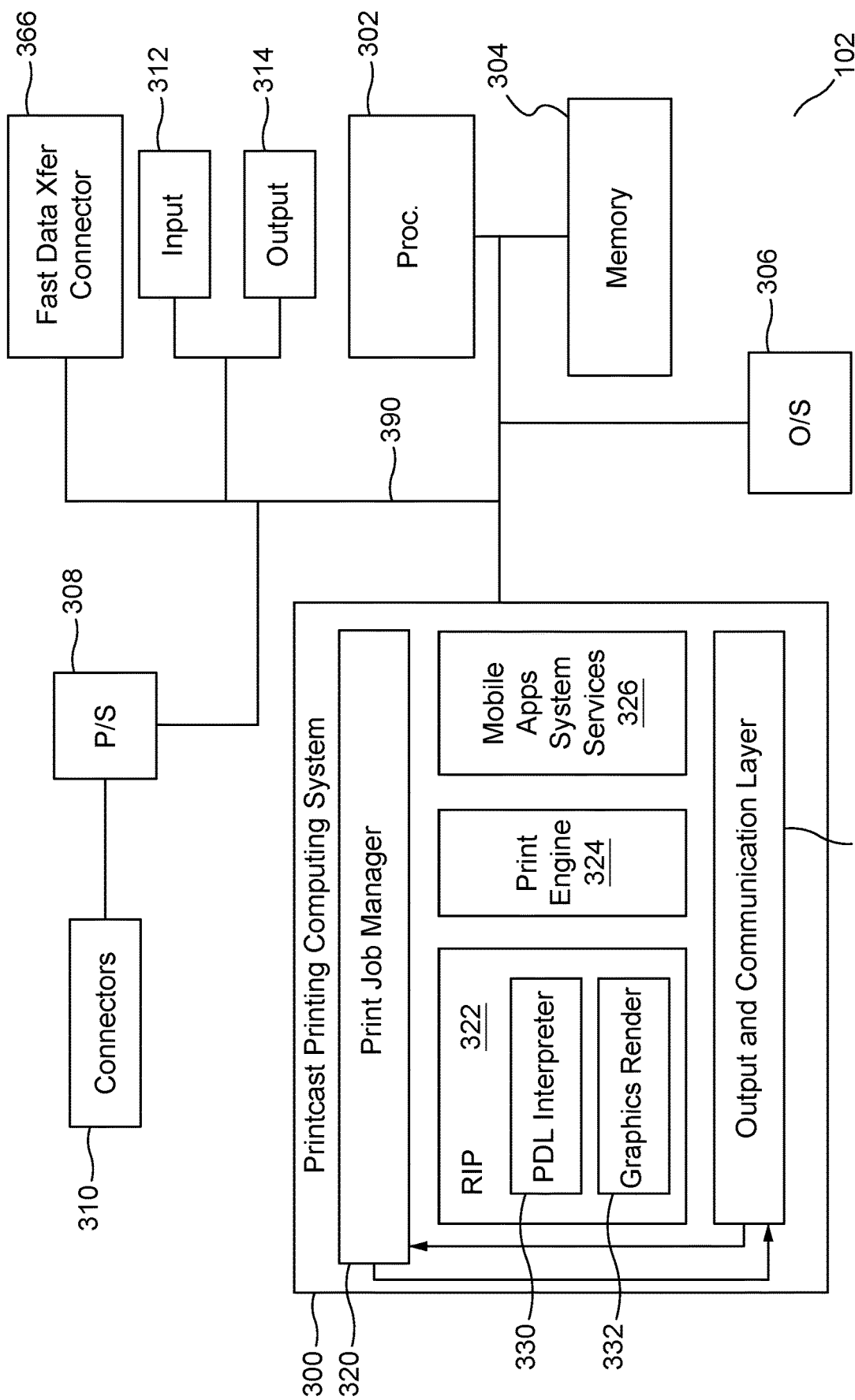
FIG. 3 illustrates a block diagram of the components for the printing computing device according to the disclosed embodiments.

FIG. 3 depicts a block diagram of the components for a printcast printing computing device 102 according to the disclosed embodiments. Additional components may be implemented within printcast device 102. Printcast device 102 includes printcast printing computing system 300 that provides the functionality to enable the device to manage print jobs and interact with MFP 104 and engine 106. In some embodiments, printcast printing computing system 300 may be referred to as a printcast system 300, portable printing computing system 200, or system 300. Printcast system 300 is disclosed in greater detail below.

Printcast device 102 also includes components that enable the device to stand alone as a computing device, such as processor 302 and memory 304. Processor 302 executes instructions and commands. It also instructs the other components to perform actions. Memory 304 may store the instructions executed by processor 302. Memory 304 also stores data and information for use by components within printcast device 102. Processor 302 and memory 304 may be connected by bus 390.

Bus 390 also connects other components in printcast device 102 to processor 302 and memory 304. Operating system 306 is provided. Operating system 306 may be a mobile operating system that provides the software platform for other programs to run on printcast device 102. Operating system 306 is responsible for determining the functions and features available on printcast device 102. For example, operating system 306 allows printcast system 300 to run within printcast device 102.

Printcast device 102 may include a power supply 308. In some embodiments, power supply 308 may be stand alone, such that printcast device 102 does not need to draw power from another source. Power supply 308 may obtain power from a connected device, such as MFP 104. Power supply 308 may use one or more connectors 310 to draw power. For example, if printcast device 102 is connected to a USB hub or port, then connectors 310 may be two wires within the USB interface to connect to power within MFP 104.

Printcast device 102 also may receive and send data over network 108 as well as to the connected MFP 104. Input 312 and output 314 represent the capability to exchange data, such as over wireless connection 122. Input 312 and output 314 also may include the wires through the USB cable to MFP 104 from printcast device 102, if applicable. Input 312 may include multiple input ports while output 314 may include multiple output ports. Input 312 and output 314 may receive commands and data from printcast system 300 as well as provide data when received from network 108.

Printcast system 300 includes components that allow it to support connectivity with network 108 and provide the functions disclosed in greater detail to manage MFP 104 and engine 106. These components are shown in FIG. 3.

Print job manager 320 is a firmware component that receives print jobs from network 108 or any of the supported connectivity methods. Print job manager 320 also may receive print jobs from other printcast devices 102. It arranges the incoming data into unique print jobs. Print job manager 320 may identify each print job with a job identification (ID), a timestamp, user/owner IDs, and similar data for the purposes of job scheduling, document tracking, and job management purposes. After completing these tasks, print job manager 320 schedules the sending of the print jobs to MFP 104 and relays them down to RIP firmware 322.

RIP firmware 322 is a full raster image processor that provides functionality to printcast system 300. RIP firmware 322 may provide all the capabilities of a RIP firmware in a printer engine except for the actual rendering on paper. The rendering may be done by engine 106 of MFP 104. RIP firmware 322 includes the following sub-components of PDL interpreter 330 and graphics rendering component 332. These are disclosed in greater detail below.

PDL interpreter 330 performs the parsing and processing of the print jobs managed by print job manager 320. The page description languages supported by printcast system 320 and printcast device 102 are those that are newer versions or more up-to-date versions of the PDL interpreters already installed and supported by the firmware of engine 106. PDL interpreter 330 also may be a totally different, new, and unsupported PDL interpreter from the one installed for engine 106. In this latter scenario, PDL interpreter 330 is a new technology provided by printcast device 102. It may be a new XPS interpreter, a new PDF interpreter, a personalized print markup language (PPML) interpreter, or some future PDL processor. In some embodiments, printcast system 300 may have access to several PDL interpreters such that it calls on the one related to needs of MFP 104 and network 108.

Graphics rendering component 332 is the second sub-component of RIP firmware 322. PDL interpreter 330 interacts with graphics rendering component 332 for the translation of PDL commands to generate a graphics order list. The graphics order list is a list of graphics orders. It is a low-level binary data similar to assembly language or computer machine language. The graphics orders are the actual configuration and drawing commands that may be executed and processed by engine 106. Graphics rendering component 332 may produce a logical representation of the page for the document, which is a raster image or some other encoded representation. In some embodiments, graphics rendering component 332 may execute and process the graphics orderlist to generate several bands of data that can be downloaded to engine 106 of MFP 104 for final processing to put markings on the paper.

Output from graphics rendering component 332 may be packaged in at least two ways to engine 106. One way may be the PDL print jobs translated so that the target MFP 104 or printer engine 106 can process. Another way may be a wrapped raster image in a new kind of print job that can be processed directly at MFP 104 or printer engine 106. The raster image is the binary data representation of the incoming print job after getting processed through PDL interpreter 330 and graphics rendering component 332. It is possible to generate a compressed raster image that can be downloaded to engine 106 that would allow MFP 104 to skip further RIP processing. The raster image may be directly processed for putting marking or ink onto the paper when printing. This action is disclosed in greater detail below.

Printcast system 300 also includes printcast engine 324. Printcast engine 324 is a management mechanism for the main printcast system 300 features and functionalities. Printcast engine 324 communicates with printer drivers for the identification, settings, and capabilities of printcast device 102. It also advertises printcast device 102 as another print queue in the network. Printcast engine 324 also receives and processes print jobs from print job manager 320 and decides when to pass through the PDL print job or the processing of the PDL print job in RIP firmware 322. It also supports managing, launching, and coordinating with hosted mobile applications system service 326. Printcast engine 324 self-upgrades with a newer version from server 114 through network 108. Printcast engine 324 downloads and installs firmware upgrades from the connected imaging devices, such as MFP 104, if permitted and applicable.

Printcast engine 324 may receive at least two types of data for print jobs. These print jobs may be called printcast command "print jobs" and PDL print jobs. The print jobs differ in what each one has printcast printing computing device 102 accomplish. Some may instruct printcast system 300 to perform specific operations while others just may send instructions to MFP 104. Printcast engine 324 determines the type of print job received and acts accordingly. The functions associated with each type of data are disclosed in greater detail below.

A printcast command print job may be received from administrators, computers, devices or mobile devices connected to network 108. These commands may call on printcast printing computing device 102 to perform certain operations on print engine 324, or engine 106, such as upgrades and launches. Printcast system 300 will execute the operations. An upgrade command instructs printcast system 300 to perform a firmware upgrade and may have syntax relating to an upgrade path or the like. The path parameter may be optional and is for the path to firmware upgrade package. In other words, "path" directs printcast system 300 where to obtain the firmware upgrade package in system 100. If there is no "path" parameter, then printcast system 300 will look for the firmware upgrade package from a designated local server, such as server 114, an original equipment manufacturer (OEM) website, or safe internet/cloud storage 116. As a stand-alone computing device 102, a new tool is capable to perform firmware upgrades on connected imaging devices, such as MFP 104.

Another command for printcast system 300 is for launching mobile application services. This command may have syntax of launch app service name. The parameter "app service name" may be desired to determine the service application to launch. There may be several mobile application services that are developed and hosted on printcast printing computing device 102 using processor 302. Examples of launch commands may be launch scanner mobile service application or launch document converter service application.

Other printcast commands may be developed, integrated, and implemented for printcast system 300. These commands may instruct printcast engine 324 to perform other printer engine management routines or launch other mobile application services. The launched mobile application services would interface with corresponding mobile application in external computing devices, such as smartphones, laptops, tablets, desktops, and the like. The external mobile applications will be able to perform the implied functionalities for processing external documents. In other words, the mobile applications act as printer software that cooperates with printcast printing computing device 102 to download or process a job on the connected MFP 104. This process is disclosed in greater detail below.

Because printcast commands will be received through the same channels of PDL print jobs, printcast engine 324 must have a way to distinguish the print jobs from each other. Printcast commands, however, should be packaged to work within the current PDL print job framework so that they look like any other PDL print jobs. Thus, printcast commands may have a header section and trailer section that wrap the main printcast commands. The sections include header data and trailer data that identify the data segment as a special printcast command "print job" so that printcast engine 324 and printcast system 300 can act accordingly.

For example, a possible printcast command "print job" may be:

255072696E744361737421 (header section)
Command [parameter]
255072696E74436173742121 (trailer section)

The header data is an encoded start identifier, which, for this example, is "%PrintCast!" in hexadecimal numeric encoding. The trailer data is an encoded end identifier, which, for the example, is "%PrintCast!!" in hexadecimal numeric encoding. This feature may be enhanced and re-defined further to use other encoding, encryption, and formatting standards, such as the use of XML or HTML formatting. It also is possible to include more than one printcast command between the header and trailer sections. Printcast engine 324 may do a pre-parsing of the header data to identify whether the incoming print job data is a PDL print job or a printcast command print job. Some examples of printcast command operations may be as a firmware upgrade, a mobile scanning and print operation, or document conversion. These examples processes are disclosed in greater detail below.

Printcast engine 324 also receives PDL print jobs from components within system 100. Print jobs are received, as scheduled, from print job manager 320. If the print job request is a regular print job, then printcast printing computing device 102 treats it like a normal print job would be treated at MFP 104, except with some differences. Printcast engine 324 may either process PDL print jobs locally in device 102 through RIP firmware 322 or relay down, or pass-through, to MFP 104.

Printcast printing computing system 300 also may include input/output and communication layer (hereinafter communication layer) 328, which may be an interface layer for management of connected devices, both input and output. This may be through device drivers, operating system 306, a TCP/IP interface, or other connectivity technologies. The input aspect is for networking connectivity by interfacing with print job manager 320 for the receipt of the print jobs, responding to queries for system capabilities, and coordinating and communicating between mobile application system services 326 and external mobile application clients. The output aspect is for interfacing with the connected printing or imaging device, such as MFP 104 or engine 106. Communication layer 328 also transmits or downloads a rendered or pass-through print job within printcast printing computing system 300. Communication layer 328 may be connected to MFP 104 through a wired, wireless, or direction connection, shown as connectors 310 in FIG. 3. Fast data transfer connector 366 also is shown. In some embodiments, fast data transfer connector 366 includes a high-definition multimedia interface (HDMI) tip or connector that connects to a corresponding HDMI port in MFP 104. This feature is disclosed in greater detail below.

Printcast printing computing system 300 also includes mobile applications system services 326. As fully functional computing device with operating system 306, memory 304, processor 302, and networking connectivity through input 312 and output 314, software services can be hosted, function, and operate in device 102. Examples of categories or types of applications that can be launched by printcast printing computing system 300 are scanning software for printers that are not multi-functional, document conversion software, on-demand printing, or administrative applications. Administrative applications include one that can instruct printcast engine 324 to do firmware upgrade, reboot, reset, wake-up, and the like.

Figure 4:
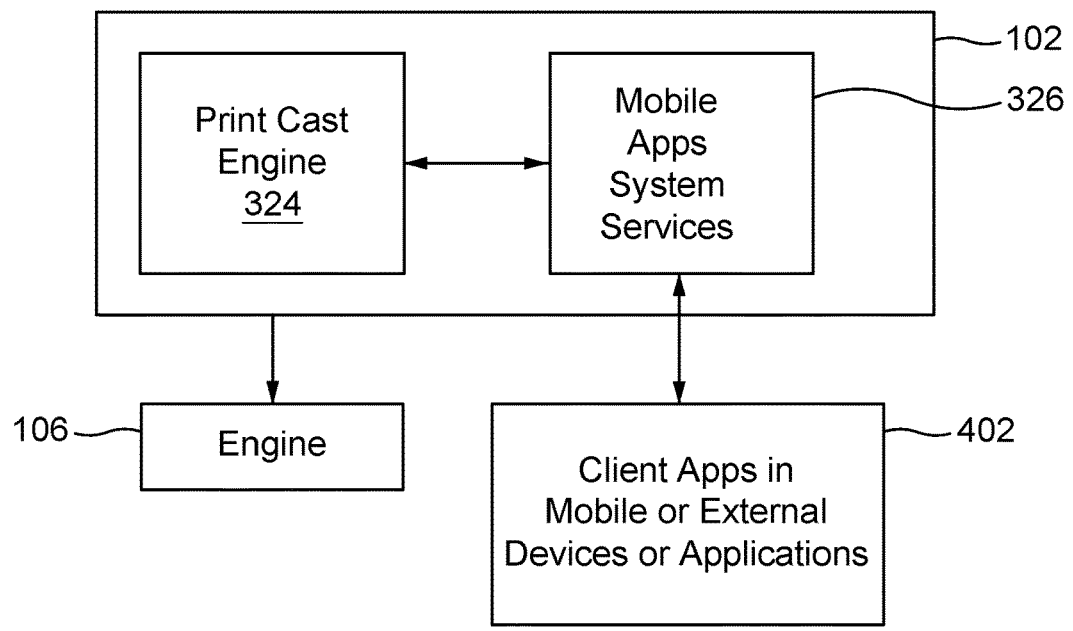
FIG. 4 illustrates a block diagram of the components for use with mobile applications system services according to the disclosed embodiments.

A server-like system services component is integrated into printcast printing computing device 102, and managed through printcast engine 324. By interfacing with printcast engine 324, mobile application system services 326 can run locally in device 102, as shown in FIG. 4. The applications of mobile application system services 326 can have varied features like image processing, document conversion functionalities, document storage, user account management, and the like. Application interface (API) services are provided to clients that would be external to device 102, such as components connected through network 108, or client applications 402. Client applications 402 may reside on mobile devices 110 or computers 112. As discussed above, client applications 402 may act as an extension to engine 106 via printcast engine 324 in that functionality is provided by the external applications to perform operations using the engine in MFP 104.

MFP 104 receives the output data from printcast printing computing device 102. MFP 104 and engine 106 process the data like other incoming print jobs or communications from network 108. In some embodiments, no change on the hardware or firmware components of MFP 104 or engine 106 is required for upgrades as device 102 provides the new features and capabilities to the existing device.

It is possible to integrate technologies defined in the disclosed technology in order to enhance and improve the performance and processing efficiency of the interaction between MFP 104 and printcast printing computing system 300. For example, engine 106 of MFP 104 may have an upgraded firmware that communicates with a connected device 102. All incoming print jobs that device 102 will process can be formatted in a certain way that is compatible with the upgraded interaction and communication path. The print jobs also are processed more efficiently when received at MFP 104.

Figure 5:
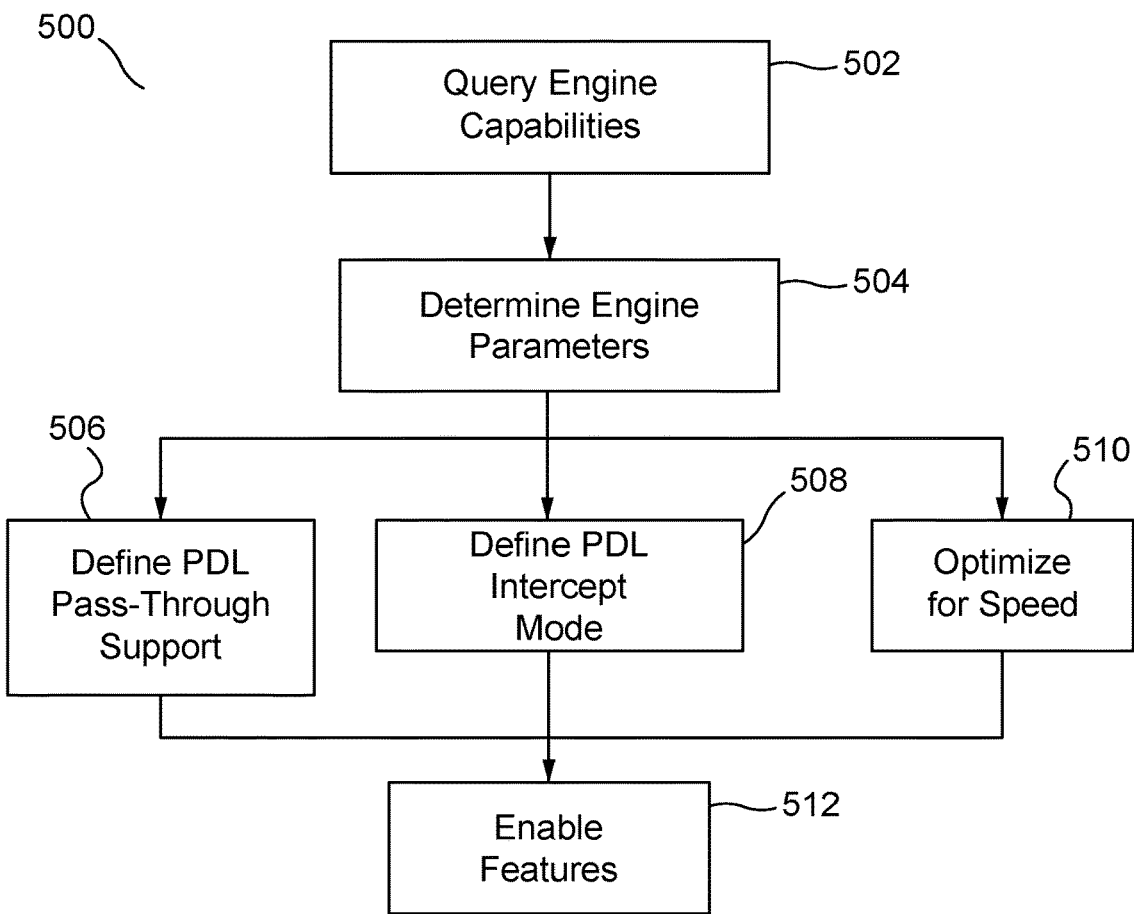
FIG. 5 illustrates a flowchart for configuring a printing computing device when connected to a MFP according to the disclosed embodiments.

FIG. 5 depicts a flowchart 500 for configuring printcast printing computing device 102 when connected to MFP 104 according to the disclosed embodiments. Whenever device 102 is connected to an imaging device, such as MFP 104, it will configure itself in order to determine and enable its features and capabilities. Printcast engine 324 may use the data about the connected imaging device to determine how it will function. Flowchart 500 shows the steps used to complete the configuration.

Each MFP 104 comes with pre-installed engine firmware and other firmware. The firmware may be of a particular version at the time MFP 104 is brought on-line. The firmware components may be upgraded after MFP 104 is shipped. Moreover, MFPs and devices may become old or obsolete. Future versions of the firmware may include features, bug fixes, enhancements, and the like. The new upgrades may not be backward compatible with existing firmware on MFP 104. The upgrades are known to the MFP manufacturer and may be catalogued at the factory or other location. A mapping of firmware versions may be provided at the factory, for example, and then contained in a server or on the internet/cloud. It may be in a database and shared through queries using SQL connections and other methods. In other words, the firmware upgrades and associated information may be accessible at a storage location on network 108 by device 102. Alternatively, it may be possible to package this data and include it when setting up device 102, either as a resource file or statically linked with its software components.

Step 502 executes by querying engine capabilities. Printcast printing computing system 300, and more specifically, printcast engine 324, can query for the mapping of firmware versions and associated data from a server, such as server 114, in order to determine what PDLs and technologies are enabled for MFP 104 and engine 106. It also may query what limitations, restrictions, concerns, and the like might apply to MFP 104. For example, printcast engine 324 queries for engine firmware versions, capabilities, and other relevant information in order to determine necessity for firmware upgrades or for determining what PDLs are supported on engine 106.

In some embodiments, the data may be included in printcast printing computing device 102 as static data. The static data may be a separate resource file stored in memory 304 or can be statically linked with printcast printing computing system 300. Printcast engine 324 may query only server 114 for data that is newer than what is already included locally in device 102. In other words, printcast engine 324 may determine whether data about MFP 104 also needs to be upgraded.

Step 504 executes by determining engine parameters for engine 106 of MFP 104. Printcast engine 324 receives and processes data for its queries for engine restrictions, limitations, features, and other capabilities. With this data, printcast engine 324 effectively "knows" the capabilities, or lack thereof, of connected MFP 104. It may use this knowledge to provide and enable new features, enhancements, and upgraded capabilities and technologies to MFP 104.

This step also may be referred to as defining rules and capabilities. Printcast engine 324 may define at least three rules and capabilities. These may be shown in steps 506-510. Step 506 executes by defining PDL pass-through support. PDL pass-through support is enabled for PDLs that are known to be working on MFP 104 and have no critical issues. Print jobs may pass through printcast printing computing system 300 as normal, and may even go directly to communication layer 328 for output to MFP 104. Newer firmware versions or upgrades are not detected.

If the local PDL is known to have critical issues either in firmware or hardware, printcast engine 324 may intercept incoming print jobs with the compromised PDL. Printcast engine 324 processes the print jobs locally in printcast printing computing system 300 through RIP firmware 322. It then sends the print job to MFP 104 for processing. Though PDL pass-through support is enabled because MFP 104 includes the proper version of the local PDL, printcast engine 324 determines that the local PDL is corrupt, possibly due to ASIC, halftone, hard-drive, or ROM memory corruption and institutes this intercept mode. Printcast engine 324 may receive information about the local PDL from MFP 104.

Step 508 executes by defining the PDL intercept mode by printcast engine 324. The PDL intercept mode is similar to what is defined above. The print job for a PDL is intercepted and processed by printcast printing computing system 300. It is not passed through to MFP 104. If a new version of PDL is available for print job processing that is better than what is installed on MFP 104, then printcast engine 324 will intercept the print jobs with the PDL. The print jobs are processed locally on device 102. Once processing is complete, the print job is output to engine 106.

Step 510 executes by optimizing for speed. If the rendering capabilities of engine 106 can be determined, then printcast engine 324 may enable generation, translation, or conversion of incoming print jobs to a format that is processed more efficiently on engine 106. For example, if printcast engine 324 determines that MFP 104 includes a version 2.3 of some compression and decompression algorithm in the application-specific integrated circuit (ASIC) of the MFP, then the printcast engine will inform RIP firmware 322 in printcast printing computing system 300 about such version. RIP firmware 322 would translate and convert applicable incoming print jobs not going through pass-through mode to generate the raster image representation of the pages in a format compliant to version 2.3 of the known compression and decompression algorithm in the ASIC of MFP 104.

Other rules may be enabled or disabled in order to take advantage of the processing power and upgraded features in printcast printing computing device 102. Examples of these rules may be defining and enabling restricted user access. Some users may not be able to use MFP 104 and these rules may change over time. Device 102 can enforce these rules using printcast engine 324. Another example may be enabling document storage permissions. Rules also may include defining and assigning color or monochrome printing access on MFP 104. In other words, rules that apply to what or who can access MFP 104 may be enabled using device 102 according to the disclosed embodiments.

Step 512 executes by enabling the features. Once printcast printing computing device 102 is configured and the rules are defined, it will apply and perform the rules as print jobs are received. Printcast engine 324 will treat print jobs accordingly. Device 102 also may receive commands from administrators, such as pushed firmware upgrades. In this situation, a firmware upgrade may be received at device 102. This may cause printcast engine 324 to move a local PDL from a pass-through parameter to an intercept mode one.

Figure 6:
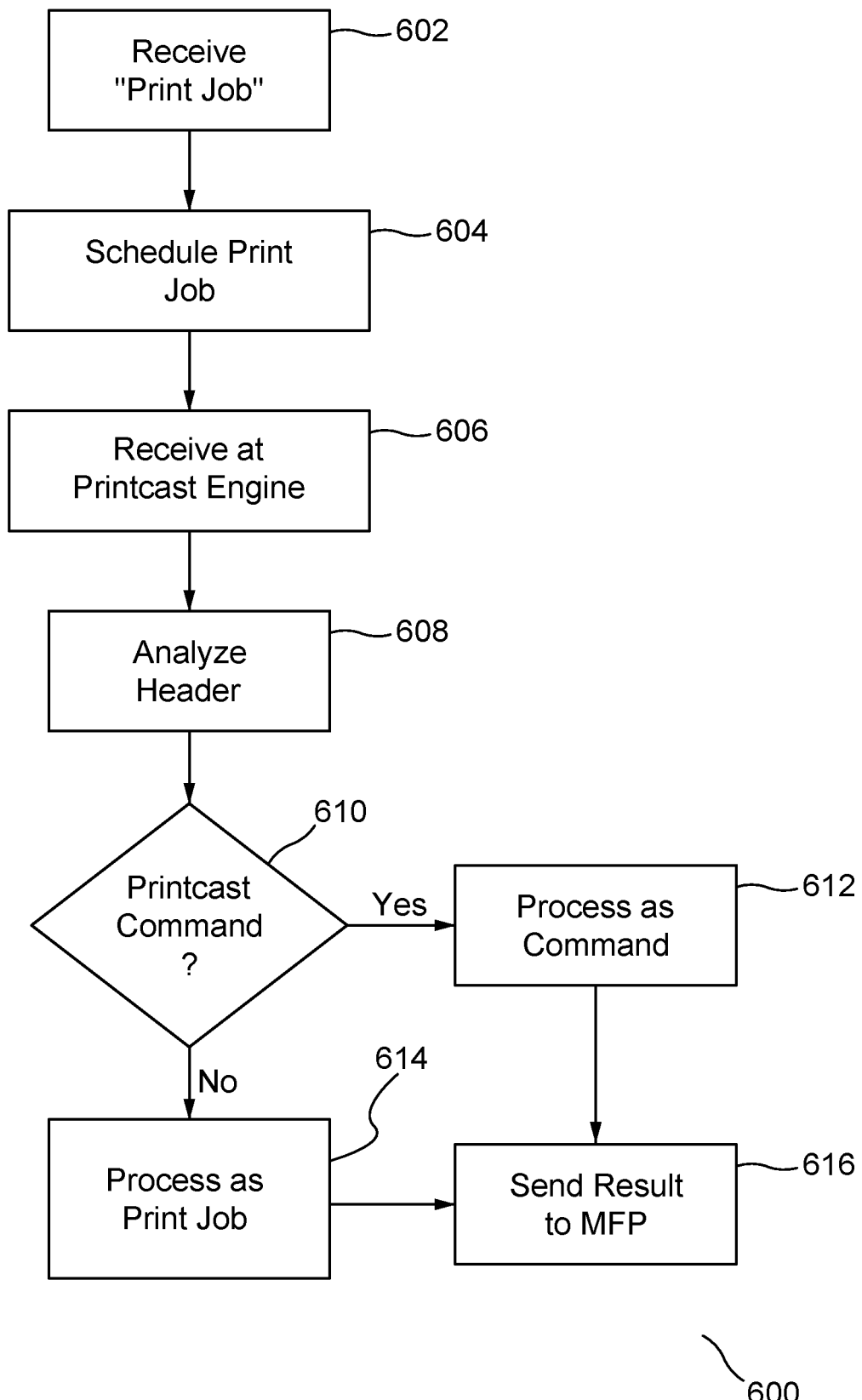
FIG. 6 illustrates a flowchart for processing a print job or a printcast command using the printing computing device according to the disclosed embodiments.

FIG. 6 depicts a flowchart 600 for processing a print job or a printcast command using printcast printing computing device 102 according to the disclosed embodiments. Flowchart 600 shows what happens with device 102 receives data from another device within system 100. Preferably, an external device connected over network 108 sends the data to have some action performed, such as printing a document or asking device 102 to perform a process. Step 602, therefore, executes by receiving a "print job" from an external, remote, or connected device or application. As disclosed above, device 102 may be selected as a destination for the print job or action, like a printer or MFP 104. The term "print job" is used but this refers to real PDL print jobs as well as printcast commands.

Step 604 executes by scheduling the print job using print job manager 320. Print job manager 320 receives the print job request and schedules it accordingly. This is one reason all incoming requests are treated as "print jobs" in that they are scheduled as such. The jobs are processed in order. For example, printcast commands are not given preferential treatment over normal print jobs. Step 606 executes by receiving the print job at printcast engine 324 when it is scheduled for processing. Printcast engine 324 analyzes the print job to determine how it will be treated in device 102.

Step 608 executes by analyzing the header of the print job. As disclosed above, the print job may include a specific header that identifies it as a printcast command. The header data includes an encoded start identifier, such as "%Print-Cast!" in hexadecimal form. This alerts printcast engine 324 that the print job actually includes a printcast command for printcast printing computing system 300. After the header is determined, step 610 executes by determining whether the print job includes a printcast command using printcast engine 324. In some embodiments, the print job can include a plurality of printcast commands.

If step 610 is yes, then printcast engine 324 will process the print job as a printcast command. Printcast engine 324 will task components within printcast printing computing system 300 to perform the functionality specified in the command or launch applications within system 300 to accomplish tasks. This process is disclosed in greater detail below by FIGS. 7-10.

If step 610 is no, then printcast engine 324 will treat the print job as a normal PDL print job. Printcast engine 324 may determine the version of PCLXL or PDF interpreter already supported in engine 106 of MFP 104. With this information, printcast engine 324 may allow incoming PCLXL and PDF print jobs to pass-through and processed directly by MFP 104. If for any reason the version installed on engine 106 has a known bug that cannot be fixed with a firmware upgrade or there is some lack of support by engine 106, then the disclosed embodiments will process incoming print jobs in device 102 by pre-rendering it, and downloading only compatible data to MFP 104. Thus, incoming jobs identified as print jobs in step 610 may be processed in step 614 either by sending directly to engine 106 or processed in device 102. Further, if the intercept mode is enabled, as disclosed above, then the print job will be intercepted and processed by device 102.

Step 616 executes by sending a result of steps 612 or 614 to MFP 104. The result may be data generated from the actions of computing system 300 either from the printcast command or PDL print job. The result is the data provided to MFP 104 due to the interaction of device 102 with the incoming request from an external device. The data may be upgraded firmware to be deployed on MFP 104 or a processed document for printing. The data may be in a format usable by engine 106 or MFP 104. The result comes from communication layer 328 that communicates with MFP 104.

Figure 7:
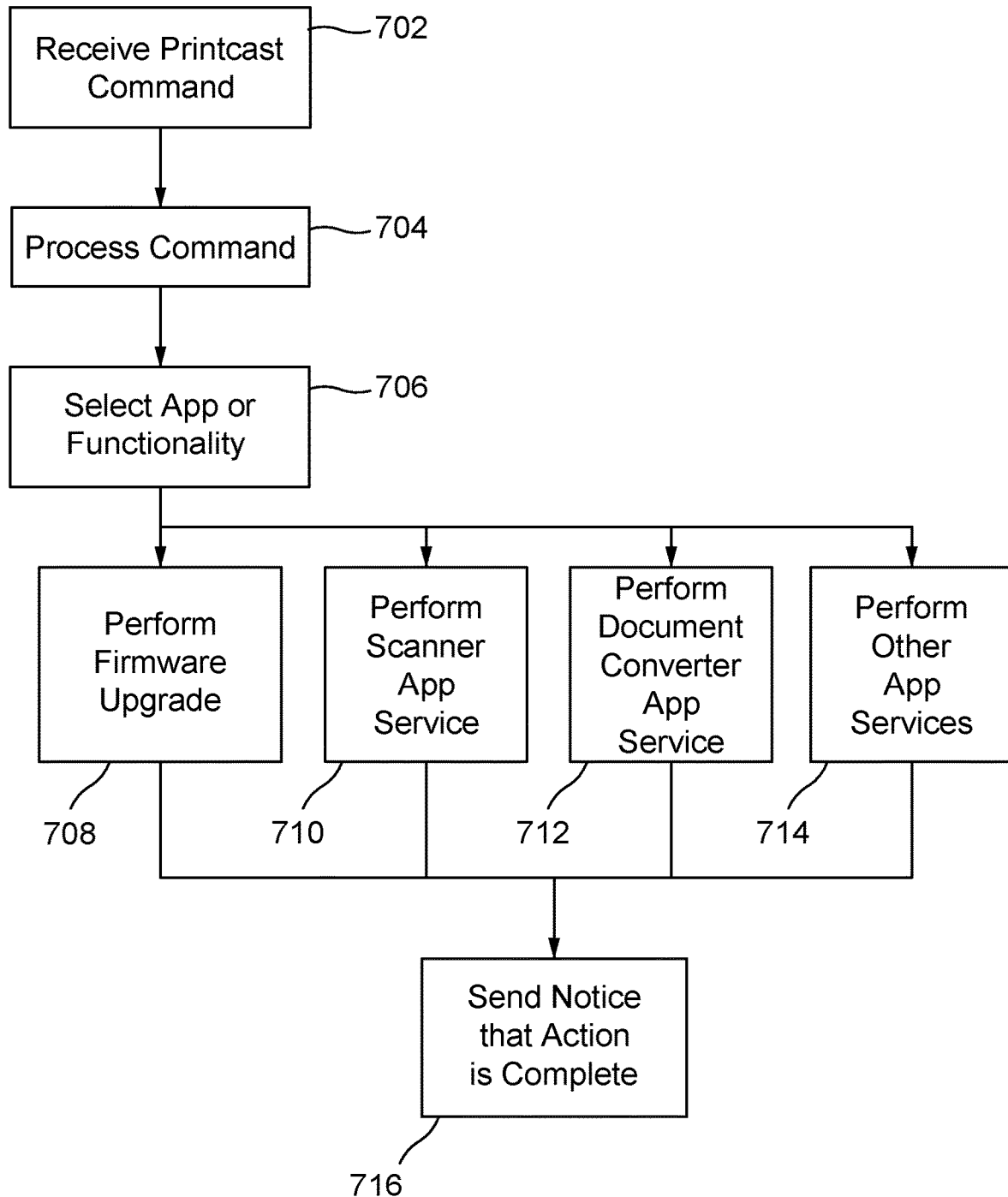
FIG. 7 illustrates a flowchart for processing a printcast command according to the disclosed embodiments.

FIG. 7 depicts a flowchart 700 for processing a printcast command according to the disclosed embodiments. Flowchart 700 provides an overview of how the printcast command is treated by printcast printing computing system 300 within device 102. In short, the printcast command will include one or more instructions tasking computing system 300 to take some action. For example, actions may include upgrading firmware, launching an application to interact with an external device, or providing a service to an associated application.

Step 702 executes by receiving the printcast command at printcast engine 324. Step 704 executes by processing the printcast command. Printcast engine 324 analyzed the header of the print job that comprised the command earlier. This step may remove the header and trailer so that only the command remains. In some embodiments, the printcast command may have a format of Command [parameter].

The command includes the action to be taken, such as upgrade or launch. Parameter includes a path or location to direct printcast printing computing system 300, such as a memory storage location or an application within mobile applications system services 326. Other formats may be used as well.

Step 706 executes by selecting the appropriate application or functionality to implement using the printcast command. In some embodiments, at least four operations may be taken using a printcast command, disclosed in greater detail below. Additional operations may be taken, such as tasking computing system 300 to retrieve data or information from MFP 104. Printcast engine 324 instructs the components of computing system 300 to perform the operations, disclosed by steps 708-14.

Step 708 executes by performing a firmware upgrade to be deployed in MFP 104. Step 710 executes by performing a mobile scanner application service for a mobile scanning application on an external device. Step 712 executes by performing a document converter application service to support a new PDL that MFP 104 does not support. Step 714 executes by performing other application services. Application services in printcast engine 324 interacts with external client mobile applications in smartphones, tablets, desktops, laptops, browsers, and other computing devices connected to device 102 through network 108. Interactions may include providing information the external mobile applications as well as using mobile applications system services 326 to act as software or firmware between the mobile application and MFP 104. Steps 708, 710, and 712 are disclosed in greater detail in FIGS. 8-10.

Step 716 executes by sending a notice confirming that the action for the command is complete. Step 716 may be optional in that an actual notice does not need to be sent. For example, an email may be sent that the firmware upgrade was successful or a text that the scanning document from the mobile application on the external device has been printed. Flowchart 700 then may return to flowchart 600 to process the next print job. Print job manager 320 may deliver the next print job to printcast engine 324.

Figure 8:
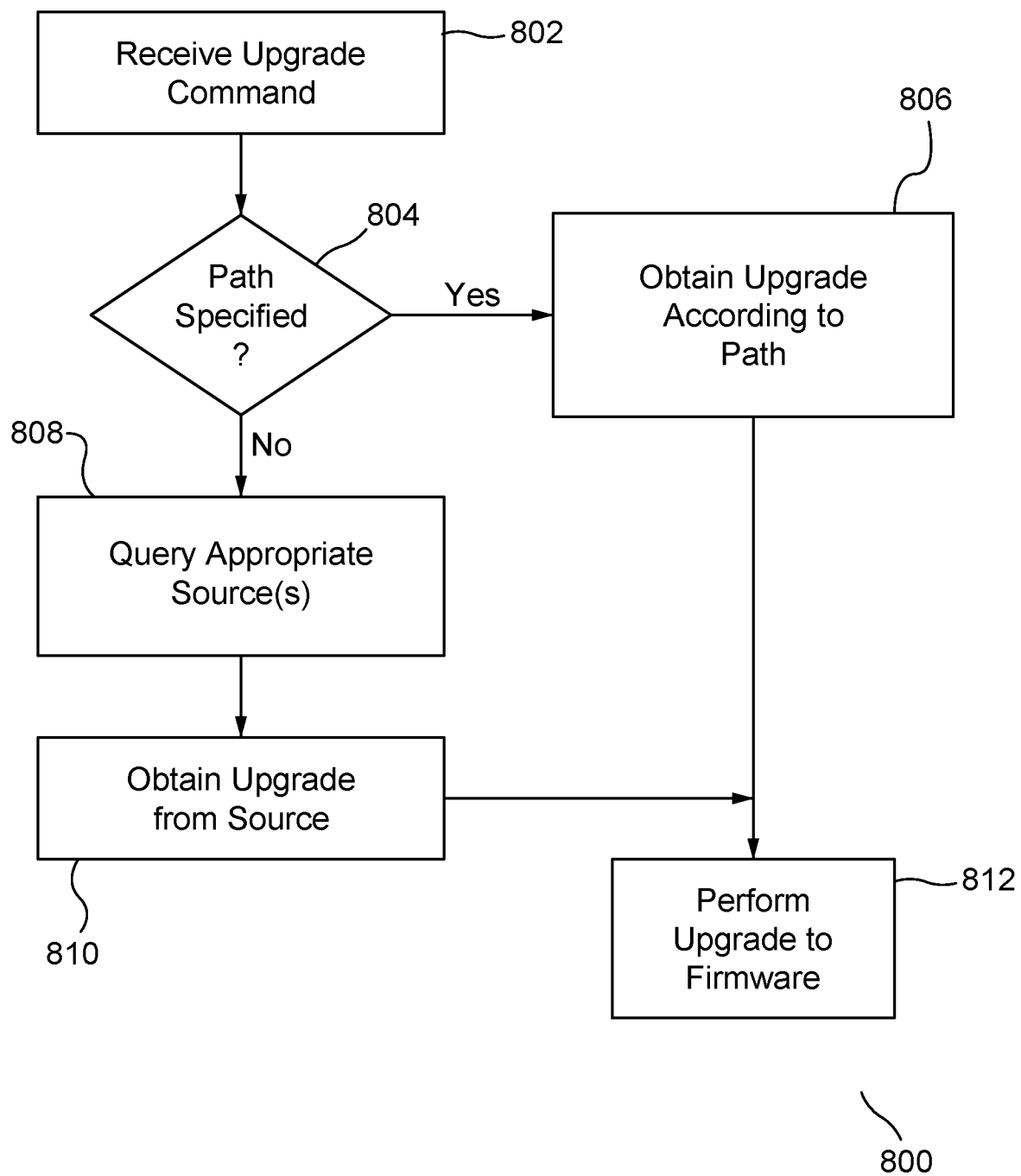
FIG. 8 illustrates a flowchart for performing a firmware upgrade using a printing computing device according to the disclosed embodiments.

FIG. 8 depicts a flowchart 800 for performing a firmware upgrade using printcast printing computing device 102 according to the disclosed embodiments. Flowchart 800 corresponds to step 708 in flowchart 700, though step 708 is not necessarily limited to the steps shown in FIG. 8. A user may send an upgrade command when notified that one is available. Alternatively, upgrade commands may be sent periodically to have device 102 query the sources on the network to retrieve an applicable upgrade.

Step 802 executes by receiving the firmware upgrade command in a print job. Printcast engine 324 determines that a firmware upgrade is requested from the instruction in the printcast command. Printcast engine 324 then analyzes the printcast command to determine if it includes a parameter or value in the instruction. Step 804 executes by determining whether a path is specified by the parameter or value. The path may be the path to the firmware upgrade package. In other words, the path may specify a location in system 100 or network 108 that includes the package for download to complete the upgrade. Alternatively, the instruction of the printcast command may just be an upgrade command without any extra parameter.

If step 804 is yes, then step 806 executes by obtaining the upgrade package from the location indicated according to the path. For example, the firmware upgrade package may be stored at a memory location in server 114 of system 100. Device 102 sends an instruction to server 114 to retrieve the upgrade package. Server 114 then may send the data file to device 102. Device 102 also may provide information, such as its IP address or other identifier, to indicate that it may receive the firmware upgrade. Flowchart 800 then proceeds to step 812.

If step 804 is no, then step 808 executes by querying one or more appropriate sources for the firmware upgrade. The firmware upgrade package is available to device 102 but not through a specified path. This step may be appropriate when upgrade commands are received periodically to have device 102 check if one needs to be performed. Device 102 may query its associated file server on the local network, an original equipment manufacturer server, or other locations. Printcast engine 324 will send instructions to a location listed in device 102 to obtain upgrades. Step 810 executes by obtaining the upgrade package from the source, similar to step 806. Step 812 executes by performing the firmware upgrade on engine 106 or MFP 104.

Flowchart 800 may relate to flowchart 500 in that computing system 300 determines that the firmware associated with MFP 104 needs to be upgraded. In this instance, device 102 may initiate the process disclosed by FIG. 8 to upgrade out of date software or firmware associated with engine 106 or MFP 104.

Figure 9:
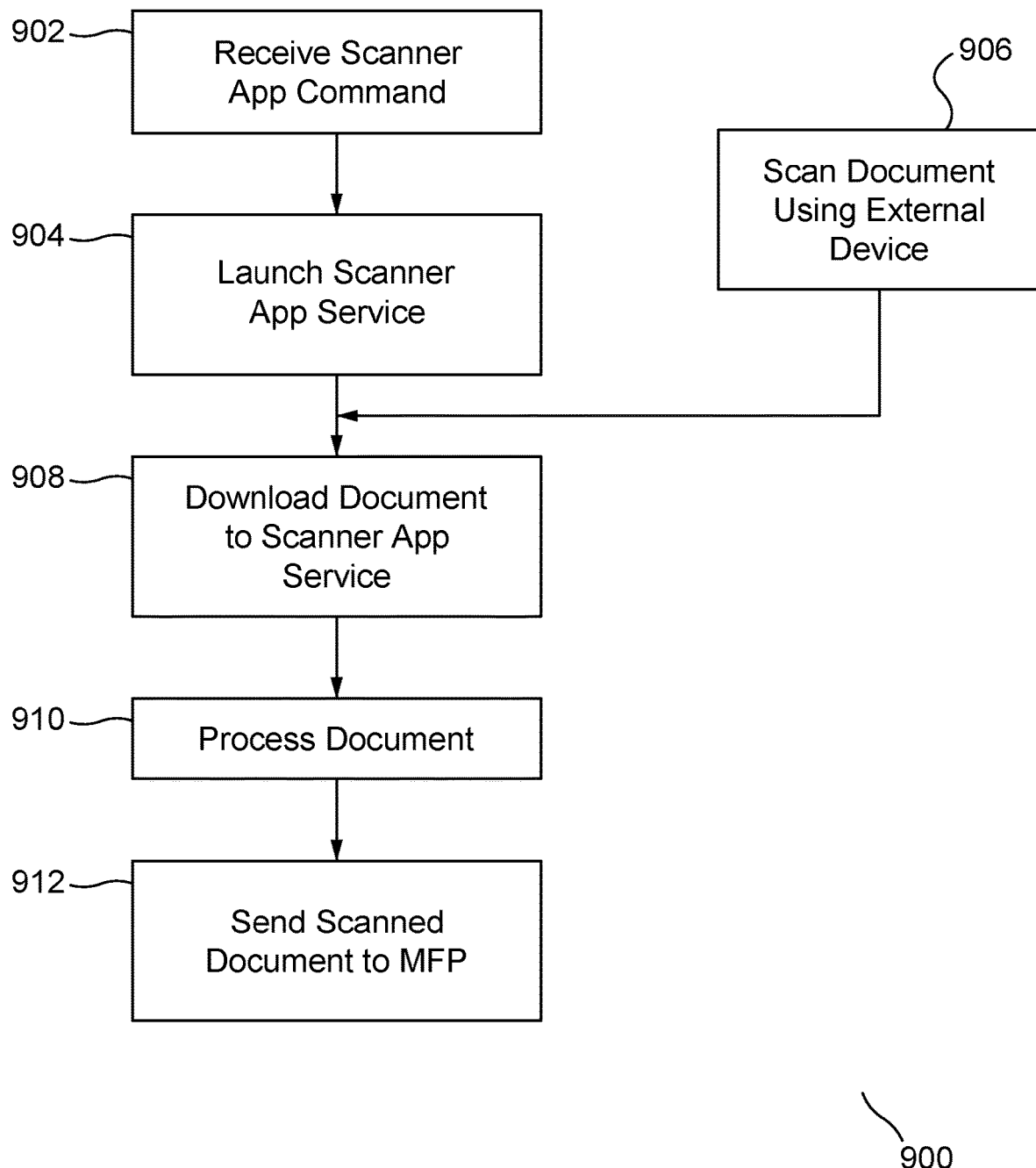
FIG. 9 illustrates a flowchart for performing a scanner application service using a printing computing device according to the disclosed embodiments.

FIG. 9 depicts a flowchart 900 for performing a scanner application service using printcast printing computing device 102 according to the disclosed embodiments. Flowchart 900 corresponds to step 710 of flowchart 700, though step 710 is not necessarily limited to the steps shown in FIG. 9. This command may be applicable when MFP 104 is a printer with no scanning support or scanner capabilities. It also may apply when MFP 104 suffers from broken scanning hardware. Users may be able to use a mobile scanning application on their mobile phone or tablet to scan original documents and download them for printing on MFP 104, despite it not having scanning capabilities.

Step 902 executes by receiving the scanner application command at printcast engine 324. Step 904 executes by launching the scanner application system service, preferably from mobile applications system services 326. The scanner application system service acts as scanner firmware or software for an MFP. Step 906 executes by scanning a document using a mobile scanning application on an external device. Referring back to FIG. 1, mobile device 110 uses a scanning application running on its processing architecture to capture an image of a document. The scanning application may refine or process the image and send it to device 102. The scanner application system service then may receive the scanned document, or captured image.

Step 908 executes by downloading the document to the scanner application system service of computing system 300. The document may be held in memory 304 until it can be processed according to the print job schedule. In other words, the document may be received at device 102 before printcast engine 324 launches the appropriate application. This step also may retrieve the document from memory 304. Step 910 executes by processing the document using the scanner application system service like a scanner would. The scanner application system service may translate the document into scanned document data recognizable by engine 106. Alternatively, this step may be executed on the external device such that the document is received at device 102 ready to be sent to engine 106. Step 912 executes by sending the scanned document data to MFP 104.

Figure 10:
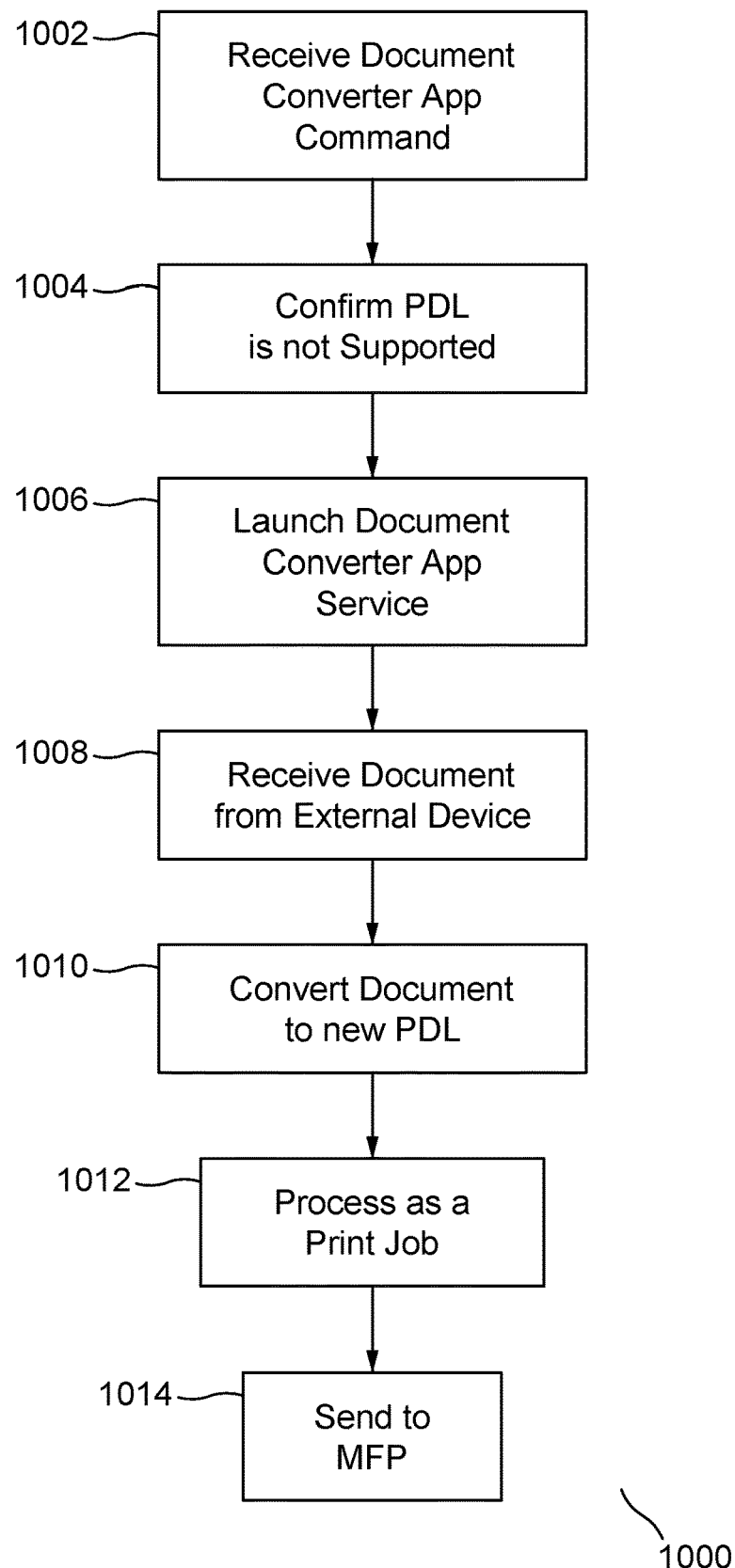
FIG. 10 illustrates a flowchart for performing a document converter application service using a printing computing device according to the disclosed embodiments.

FIG. 10 depicts a flowchart 1000 for performing a document converter application service using printcast printing computing device 102 according to the disclosed embodiments. Flowchart 1000 corresponds to step 712 of flowchart 700, though step 712 is not necessarily limited to the steps shown in FIG. 10. This command may be applicable when MFP 104 fails to support a new PDL or has a bug that would result in a failure to process a print job for the PDL. MFP 104 may not be able to convert the document into the PDL. Further, no printer driver may be readily available for a user to print directly to MFP 104. Device 102 may support the new PDL or provide the printer driver as it is registered as a print queue or server in network 108.

Step 1002 executes by receiving the document converter application command. Step 1004 executes by confirming that the PDL for a print job or application is not supported by MFP 104. This step may be executed prior to step 1002, such as when device 102 connects with the mobile application on the external device. For example, mobile device 110 may include an application that uses the new PDL. When it connects with device 102, the new PDL may be confirmed by computing system 300.

Step 1006 executes by launching the document converter application system service by printcast engine 324, preferably from mobile applications system services 326. This step also includes launching a document converter application in the external device. The document is converted at the external device to be sent over network 108. Step 1008 executes by receiving the document from the external device, such as mobile device 110, at device 102.

Step 1010 executes by converting the received document to the new PDL. Step 1012 executes by processing the converted document as a print job in device 102 and computing system 300. Step 1014 executes by sending the print job to MFP 104. Thus, computing system 300 may act as an interface between a mobile application and MFP 104.

The following example may illustrate the process, showing an indirect document conversion. A user may have a printer driver for device 102, but does not have the printer driver for MFP 104. The user may print to device 102 through the document converter application system service of mobile applications system services 326 and print any document to MFP 104. Users would not need to know about which printer driver to install for which connected MFP. One only needs to care to install and upgrade the mobile applications or printer driver for device 102. By doing so, the user can print documents to MFP 104. This feature alleviates the need to install drivers on different MFPs, which takes time and resources to upgrade each individual device.

Inside most MFP devices is a common hardware component that performs application of toner or ink material onto paper. These may be shown by printer components 220 in FIG. 2. The operation may be similar to how photographs are "developed." The common hardware may be known as the video component.

Figure 11:
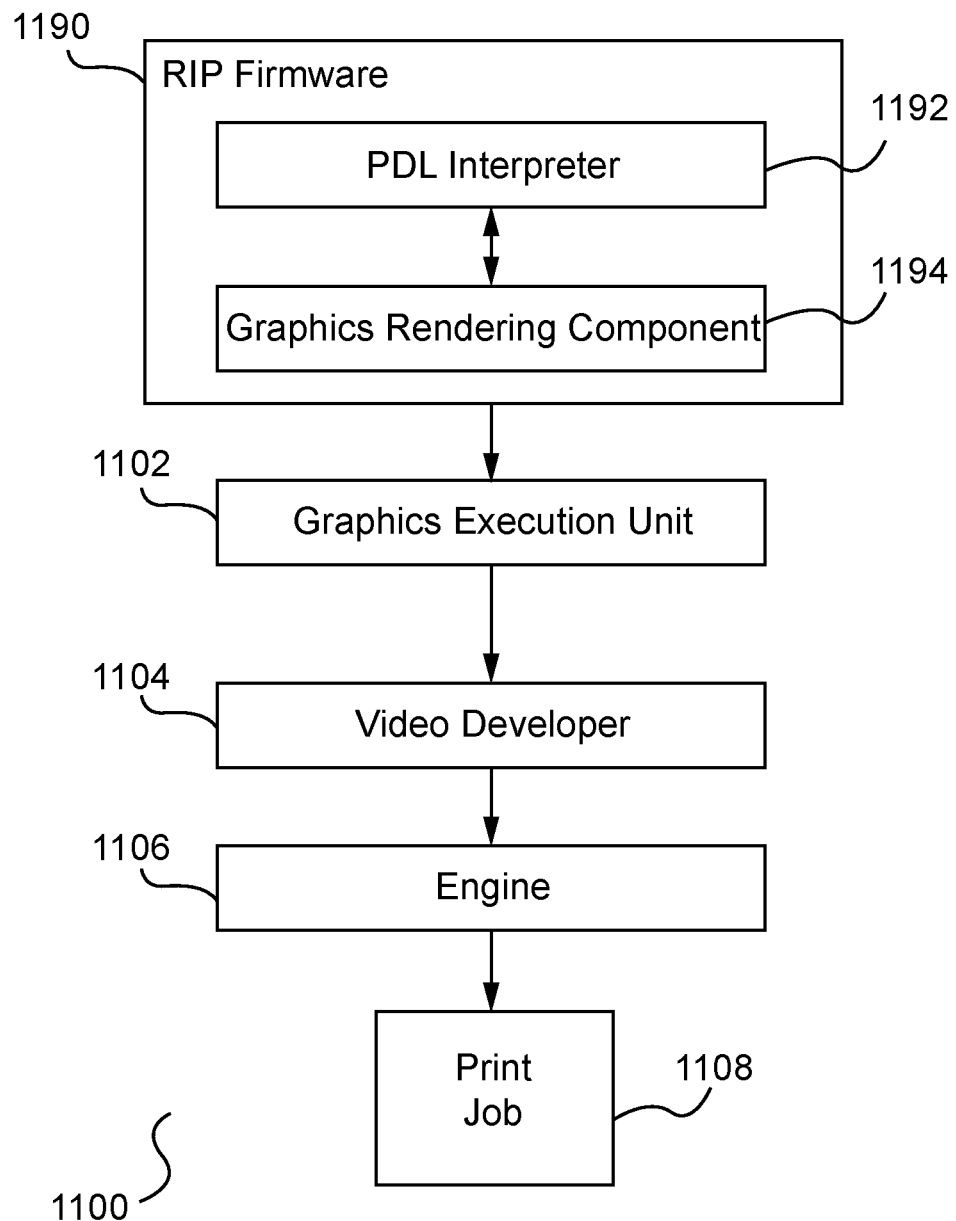
FIG. 11 illustrates an MFP having a video developing component according to the disclosed embodiments.

FIG. 11 depicts MFP 1100 having a video developer 1104 according to the disclosed embodiments. MFP 1100 may include the same components as MFP 104 disclosed above along with additional components set forth below. In MFP 1100, video developing component, or video developer, 1104 is the lowest component on the MFP. Once it "develops" or generates the imaging data onto paper for print job 1108, no further imaging processing occurs. The input data to video developer 1104 is the final kind of data that can be fed and processed before any marking or graphics are rendered on paper. When such final data is received and processed, the processing performance is optimal, or as fast as can be, because no further processing occurs after this point.

The speed at this instance in the printing process is expected to be the speed of engine 1106. Engine 1106 may be similar to engine 106 disclosed above. If engine 1106 is specified to be 60 pages per minute (ppm), then the speed of generating imaging data onto paper runs at 60 pages per minute. Engine 1106 along with video developer 1104 may generate rendered data onto paper at 60 ppm. Different engines, however, have differing pages per minute capability. Whatever the ppm value is, whether small or large, is the speed at which video developer 1104 is measured, and, therefore, how the printer speed is measured.

Prior to generating the final data for placement on the paper, the actual source print data undergoes several translation and processing steps. For example, such actions may start with a document in a word processing application, such as WORD. A second stage may be the translation of the application drawing instructions into PDL, which is done through the printer driver. The output of this stage is print job 1108. Print job 1108 is sent to MFP 1100.

RIP firmware 1190 receives print job 1108. PDL interpreter 1192 interprets print job 1108, which includes actual parsing of data according to the associate PDL. The interpreted and parsed data may go through several decoding, interpretation, translation, and transfer actions. It also may go through graphics rendering component 1194 for translation to graphics orders or lower-level drawing commands. The graphics orders would be translated to much lower representations, such as rasterized images with color values in each color plane. Example color planes may be cyan, magenta, yellow, or black. In effect, the execution of the graphics orders results in data being populated into the various color planes.

The output of RIP firmware 1190 is provided to graphics execution unit 1102. Graphics execution unit (GEU) 1102 processes the representations of the graphics orders. Graphics execution unit 1102 may be known as the hardware GEU that resides on an application-specific integrated chip (ASIC). Further, print job 1108 may go through further processing such as halftone or screens, or further color conversion due to the color profile of the destination printer, or printing components 220. Once all these processing steps are performed, the processed, interpreted, and translated print job will be relayed to video developer 1104.

Video developer 1104 develops a rasterized image onto paper. Video developer 1104 may receive video data processed through RIP firmware 1190 in MFP 1100 or from printcast device 102, disclosed above. The video data that may be processed at video developer 1104 may be referred to as having an engine-compatible video format. Video developer 1104 performs rendering of the rasterized image so that it can be printed onto paper, or any other medium. Thus, video developer 1104 allows MFP 1100 to "draw" the rasterized image onto a drum of printer components 220 and to the turning of toner or ink rollers to cause colors to stick onto the paper, if applicable. These two functions are in addition to the operations and movements of other hardware components that synchronize and move paper along the toner rollers and the turning of the drums.

As can be seen, the steps needed to perform all of the interpretation, translation, and security measures will occupy MFP 1100. Computing platform 201, as shown in FIG. 2, may be tied up as a result, and unable to process other jobs. The time executing the steps is in addition to the time spent on the "video development" itself. The total time from end-to-end will be slower in magnitude compared to just the "video developing" onto paper of the imaging data of the video component of print job 1108.

Because of these potential bottlenecks in MFP 1100, the disclosed embodiments take advantage of what video developer 1104 requires and what it can process. When such input, or particularly its syntax, is known, it is possible to develop new processes in the overall printing workflow that can take advantage of the speed of video developer 1104 with the goal and objective of guaranteed printing or imaging at engine speed of engine 1106. Printing is speeded up and made faster.

With fast performance potentials, the disclosed embodiments may offload features currently in MFPs, such as job storage, user management, job accounting, image conversion, and the like to be performed at device 102. MFP 1100 would not have to process non-urgent, non-important print jobs that include video rendering and can relay those jobs to device 102 for external processing. This feature frees up MFP 1100 for urgent or important print jobs.

Referring back to FIG. 3, fast data transfer connector 366 is shown as part of device 102. To avoid confusion, connector 366 will be discussed as connecting to MFP 1100 of FIG. 11. Fast data transfer connector 366 allows for improved processing, handling, translation, and formatting of print jobs with a video format. With connector 366, device 102 transfers efficient and optimized print data to engine 1106 or MFP 1100. Fast data transfer connector 366 provides device 102 the capability to process video by providing data to video developer 1104.

Figure 12:
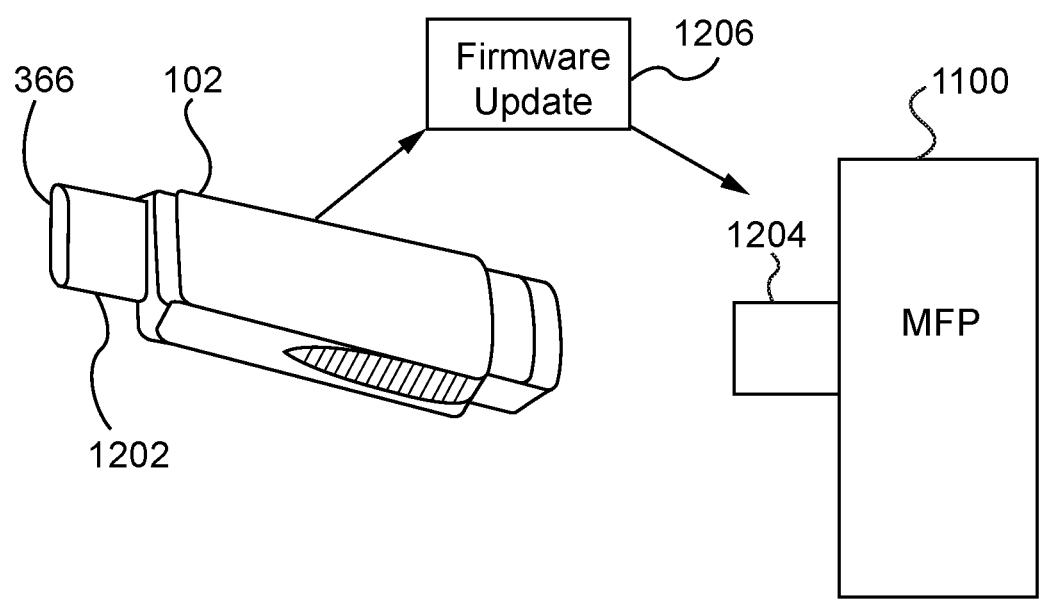
FIG. 12 illustrates a printcast device with a fast data transfer connector according to the disclosed embodiments.

FIG. 12 illustrates an example of printcast device 102 with fast data transfer connector 366. Printcast device 102 includes HDMI tip 1202 to enclose fast data transfer connector 366. HDMI tip 1202 may protect the components of connector 366 from damage. HDMI tip 1202 also allows fast data transfer connector 366 to be plugged in fast data transfer port 1204 of MFP 1100. HDMI tip 1202 is the physical way to connect device 102 to MFP 1100. MFP 104, disclosed above, also may include a fast data transfer port. Because device 102 supports HDMI, it also supports very fast data transfers to MFP 1100 as compared to USB, and the like, connections.

Fast data transfer port 1204 may be installed on MFP 1100 in addition to other ports for USB, LAN, WiFi, and the like. In one embodiment, fast data transfer port 1204 may be an HDMI port providing direct connection to video developer 1104. HDMI tip 1202 may be a male connector for plugging into fast data transfer port 1204. With fast data transfer connector 336 of device 102, all incoming print jobs may be converted into the engine-compatible video print job format that can be transmitted at a high-transfer rate to MFP 1100. Fast data transfer port 1204 allows for higher or larger bandwidth capacity transfer capabilities, such as that supported by HDMI technology.

Printcast device 102 also may provide a video receiver (VR) firmware update 1206. VR firmware update 1206 may be stored in memory 304 or other data storage 303 on device 102. It serves as a firmware update for video developing component 1104 of MFP 1100. VR firmware update 1206 adds the capability to receive and process transmitted imaging data from device 102.

Thus, device 102 receives print jobs from a variety of devices or even from MFPs. These print jobs may include video, which may require resources in MFP 1100 that are needed for other jobs. Device 102 processes the video file and then transfers the video-encoded data to MFP 1100 at HDMI speeds using fast data transfer connector 366.

According to some embodiments, device 102 provides efficient print job processing to alleviate print processing loads on MFP 1100. The device also offloads features from MFP 1100 to make it more available for urgent and important print jobs. MFP 1100 should not be tied up processing video if an urgent print job is received. Printcast device 102 also adds functionality to legacy or third-party MFPs to add value. Firmware updates and updated PDL interpreters may be used in the device to stay current in a network. Device 102 also performs print processing external to MFP 1100 when the MFP has known issues, including performance, memory limitation, and hardware issues/compatibility, when processing certain print jobs or types of jobs.

Figure 13:
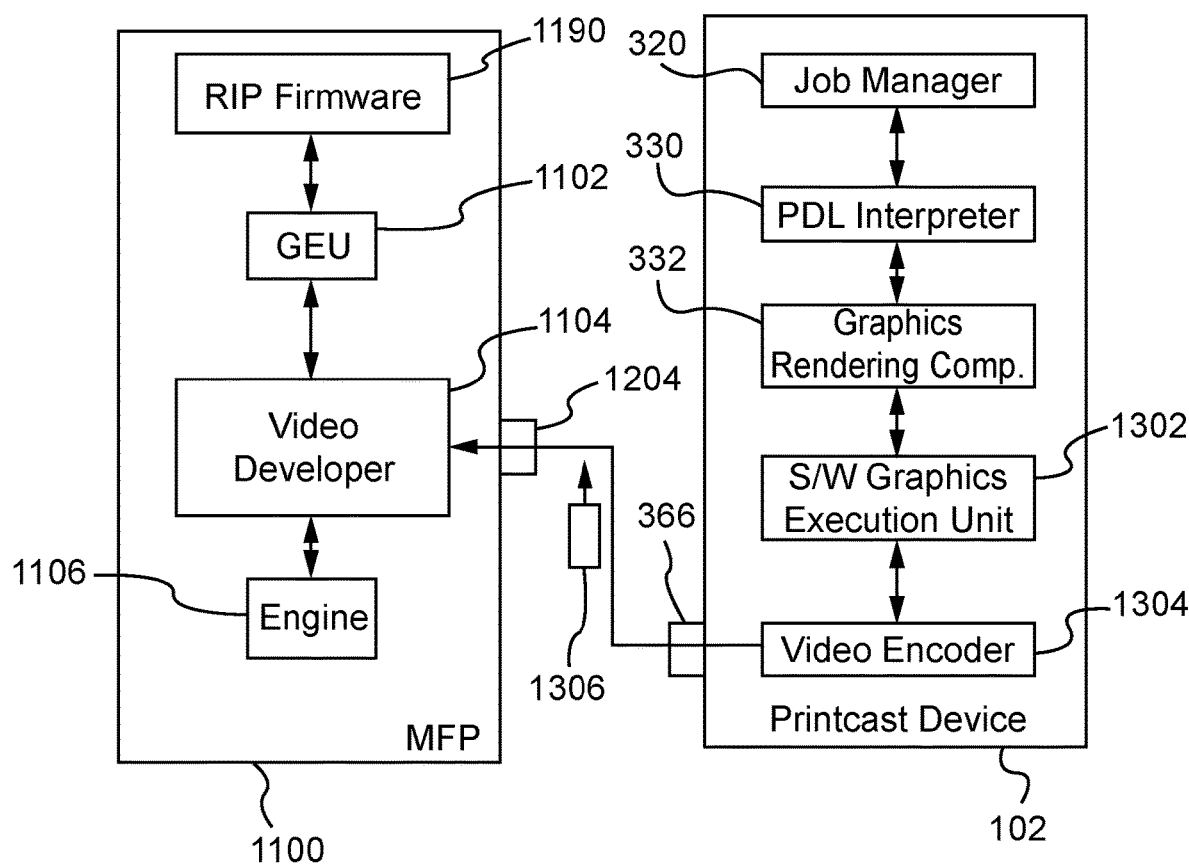
FIG. 13 illustrates the printcast device used in conjunction with the MFP according to the disclosed embodiments.

FIG. 13 depicts printcast device 102 used in conjunction with MFP 1100 according to the disclosed embodiments. In this configuration, fast data transfer connector 366 of device 102 is connected to fast data transfer port 1204 of MFP 1100. Through port 1204, device 102 is coupled directly to the lowest level possible component in the hardware of MFP 1100. The lowest possible level where printing would still be possible is at video developer 1104.

MFP 1100 includes RIP firmware 1190, graphics execution unit 1102, video developer 1104, engine 1106, and fast data transfer port 1204 as disclosed above. Other components may be implemented in MFP 1100. Device 102 includes components disclosed by FIG. 3. Print job manager 320, PDL interpreter 330, and graphics rendering component 332 perform the same functions and operations as disclosed above. Device 102 also includes software graphics execution unit 1302 and video encoder 1304.

The addition of video processing within device 102 provides the following features and advantages. Device 102 may translate any print job into the video format supported by video developer 1104 and engine 1106. Further, device 102 may transfer an engine-compatible video print job directly to MFP 1100 through fast data transfer connector 336 and fast data transfer port 1204. In turn, MFP 1100 may process and develop the video print job efficiently without having to utilize RIP firmware 1190 or graphics execution unit 1102 for extensive parsing, interpretation, and graphics rendering. RIP firmware 1190 may just need to handle and apply job and page parameters such as page media size and finishing options. The main page content is in a video format that may be processed directly in video developer 1104. In certain situations, complex documents that do not require page-specific parameters may be processed and converted into engine-compatible video format, which can, in turn, be sent directly to MFP 1100 at a high-transfer rate to achieve fast and direct printing.

Software graphics execution unit (SGEU) 1302 receives the translated graphic orders from graphics rendering component 332. SGEU 1302 is a software or firmware implementation of graphics execution unit 1102 on MFP 1100. It performs operations and calculations, preferably related to the acceleration of the building of images for output. SGEU 1302 may use a frame buffer to build the images from the video. In some aspects, SGEU 1302 may be process data slower than the hardware graphics execution unit 1102, but will be effective when implemented at device 102 because it is external of MFP 1100. It also may be used to process non-urgent print jobs.

The output of the processing by SGEU 1302 may be a new print job format, referred to as a video print job. The video print job may be defined and generated in the following file format specification:

| Name | Description |
| --- | --- |
| Print job identifier | This is the identifier for a print job to a device 102. This may be the token !PCD!, for example. For the purposes of having this new video print job format, this identifier may be enhanced to be !PCDVID!, for example. |
| Job Parameters | This may be PJL or other desirable textual entry that can pass along job parameters such as media size and finishing options, which applies to all pages in the print job. |
| Page Begin Marker | Page boundary signal to identify beginning of page. |
| Page Parameters | This identifier may be optional. This can be PJL or other desirable textual entry that pass along page-specific parameters such as media size, duplex setting, and the like, which apply to specific pages. |
| Video Data | These are the engine-compatible video data representing the page content. The data are essentially the rasterized image of the page but in the video-format that may be processed directly at video developer 1104. |
| Page End Marker | Page end marker. |
| End of Job Marker | This identifier may be optional. This can be added to identify and mark job boundaries. Other combinations of page-begin-marker + video data + page-end-marker for succeeding or subsequent pages in the print job may also be implemented. |

The data listed above may have sizes of a few bytes except for the video data, which may be several hundred bytes.

Once the images are formed, they are provided to video encoder 1304. Video encoder 1304 encodes and formats the data into a video-compliant format. The formatted data is transferred through fast data transfer connector 366 to fast data transfer port 1204 as video print job 1306. Video developer 1104 receives the data of print job 1306 to generate the imaging data onto paper. Print job 1306 corresponds to print job 1108.

As configured in FIG. 13, the data within print job 1306 from video encoder 1304 goes directly to video developer 1104. No further intermediate processing is done. No scaling, no color conversion, no halftoning, and other engine-level processing is done at this level.

Alternatively, the data in print job 1306 from video encoder 1304 may go to RIP firmware 1190. At MFP 1100, RIP firmware 1190 would detect the type of incoming printable data. The video print job that has the prepended job parameters tells RIP firmware 1190 that the print job is in the video format. It will know how to extract the page video data for sending directly to video developer 1104.

These processes are disclosed in greater detail below. With support for processing video data, device 102 may package the generated printable video print job 1306 in at least two ways. First is video data as a RIP-ready print job. Device 102 will prepend or wrap job parameters around the generated printable data. The job parameters may serve as instructions to RIP firmware 1190 of MFP 1100. The job parameters may be an identifier that print job 1306 is generated from device 102 and an identifier that the print job contains video format.

Device 102 will wrap generated page video data with page-specific parameters, if necessary. The page-specific parameters may serve as instructions to RIP firmware 1190 at MFP 1100. The page-specific parameters may be: page media, duplex setting, and the like, which may change on a page-to-page basis. When RIP firmware 1190 receives print job 1306, it detects that the print job contains data in a video format. RIP firmware 1190 applies and selects applicable job parameters and page parameters. RIP firmware 1190 also extracts embedded print job video data and passes it to video developer 1104. RIP firmware 1190 also may perform finishing, if specified in the job or page parameters.

Another way to package the generated printable video print job 1306 is having the video data as a direct-to-paper print job. Device 102 may add job and page-specific parameters in the generated printable video print job. The job parameters instruct MFP 1100 that the incoming data is in a video format that can be processed directly at video developer 1104. The job parameters may be an identifier that the print job is generated from device 102 and an identifier that the print job contains video format data. Device 102 will encode, compress, and package the generated printable data in video format for direct processing at video developer 1104 in MFP 1100.

According to the disclosed embodiments, problems such as hardware issues, performance issues, memory issues, CPU-intensive issues, and memory-intensive issues may be avoided by processing the video data externally. The data may be processed efficiently when transferred back to MFP 1100. All of these actions occur over a fast data transfer connection to accommodate HDMI-level speeds.

Figure 14:
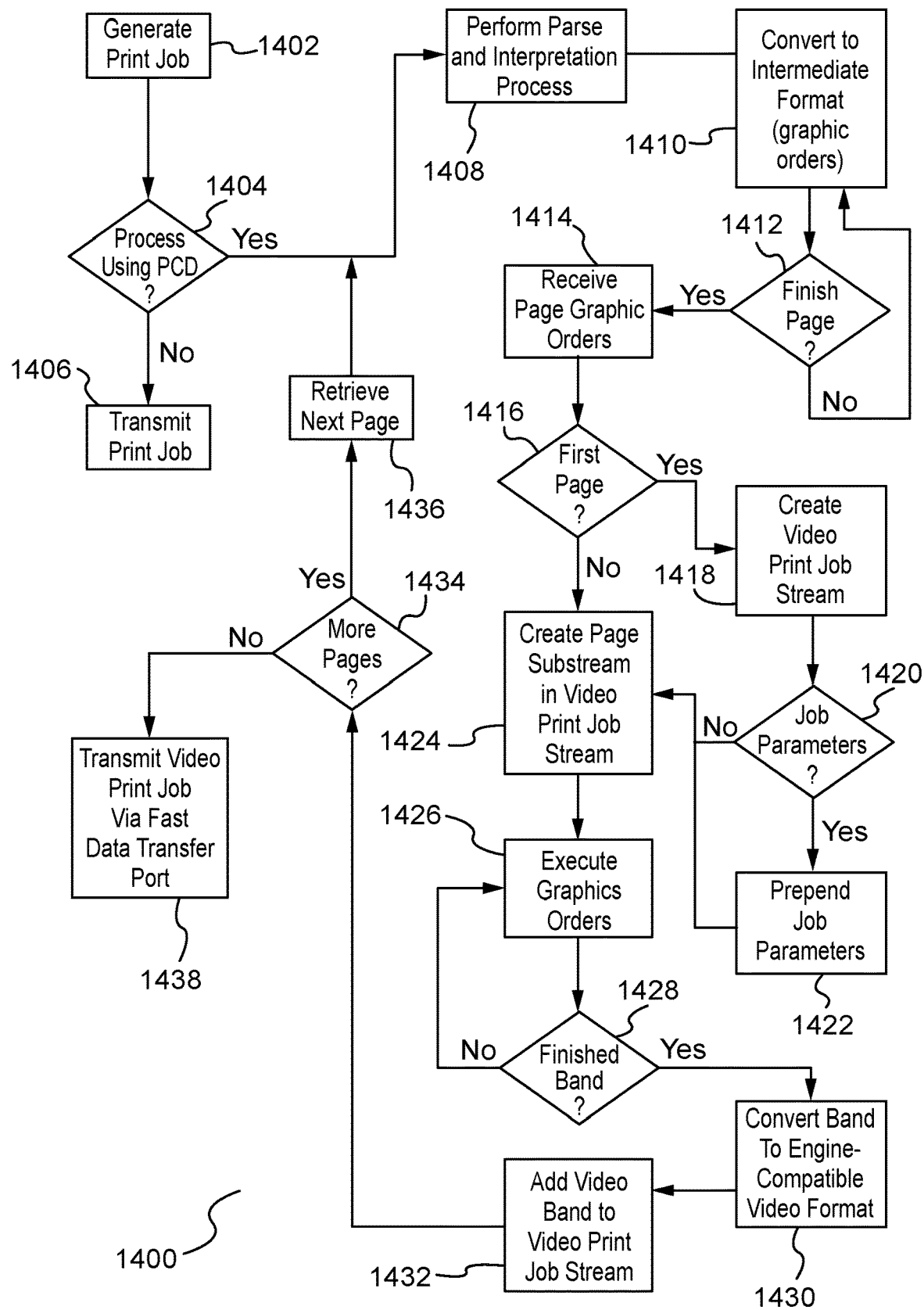
FIG. 14 illustrates a flowchart for processing video using a printcast device connected to the MFP according to the disclosed embodiments.

FIG. 14 depicts a flowchart 1400 for processing video using printcast device 102 connected to MFP 1100 according to the disclosed embodiments. Flowchart 1400 may refer back to components disclosed in FIGS. 11-13 for illustrative purposes only. The processes disclosed by flowchart 1400 are not limited to the architectures disclosed by FIGS. 11-13. FIG. 14 pertains to video print jobs with no page parameters.

Step 1402 executes by generating a print job at a printer driver or a PDF file. The print job may be PDL print job. Step 1404 executes by determining whether the print job is to be processed using device 102. For a print job related to a video file, device 102 may be automatically selected. Further, the printer driver may determine whether MFP 1100 or any applicable printing device includes firmware, hardware, or software needed to process the print job. If not, then the print job may be sent automatically to device 102. If step 1404 is no, then step 1406 executes by transmitting the print job to MFP 1100.

If step 1404 is yes, then the print job is received at device 102. Step 1408 executes by performing parse and interpretation processes on the print job. These processes may be performed by RIP firmware 322 along with PDL interpreter 330 and graphics rendering component 332, as disclosed above. Step 1410 executes by converting received data to intermediate format, or graphic orders, as disclosed above. This step may be performed by graphics rendering component 332. Step 1412 executes by determining whether component 332 finished a page. If no, then flowchart 1400 returns back to step 1410.

If step 1412 is yes, then step 1414 executes by receiving page graphic orders at software graphics execution unit

1302. As disclosed above, software GEU 1302 is distinguishable from GEU 1102. It may be slower than GEU 1102 but is effective at handling video print jobs within device 102. Step 1416 executes by determining whether the received page orders correspond to the first page of the video print job. If yes, then step 1418 executes by creating the video print job stream using GEU 1302.

Step 1420 executes by determining whether the page orders include job parameters for the video print job stream. The job parameters serve as instructions to RIP firmware 1190 of MFP 1100. Examples of the possible job parameters are disclosed above and include an identifier that the print job is generated by device 102 and an identifier that the print job contains video format. The job parameters may instruct RIP firmware 1190 or MFP 1100 that the incoming data is in video format that can be processed directly at video developer 1104. If step 1420 is yes, then step 1422 executes by prepending, or wrapping, the job parameters around the generated printable data.

If steps 1416 or 1420 are no, then flowchart 1400 proceeds to step 1424, which executes by creating a page substream in the video print job stream. Flowchart 1400 also proceeds to this step from step 1422. Step 1426 executes by executing the graphic orders by GEU 1302. Step 1428 executes by determining whether GEU 1302 finished a band by executing the graphic order or orders. If no, then flowchart 1400 returns to step 1426 to continue executing graphic orders.

If step 1428 is yes, then step 1430 executes by converting the band to the engine-compatible video format. Step 1432 executes by adding the converted video band to the video print job stream. Step 1434 executes by determining whether more pages need to be processed according to the disclosed embodiments. If yes, then step 1436 executes by retrieving the next page from the video data. If step 1434 is no, then step 1438 executes by transmitting the video print job 1306 via fast data transfer port 366 to MFP 1100.

Figure 15:
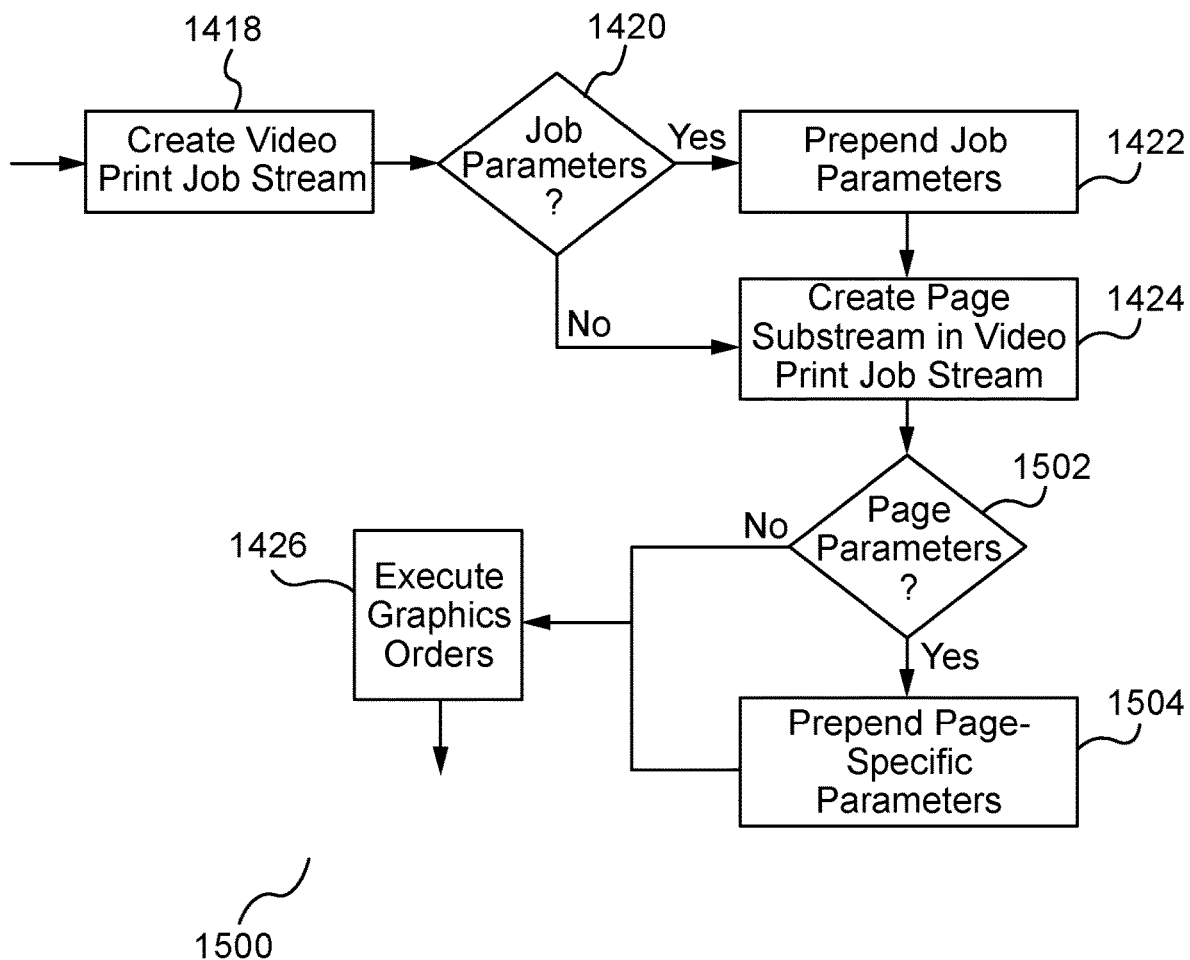
FIG. 15 illustrates a flowchart for processing video along with page parameters according to the disclosed embodiments.

FIG. 15 depicts flowchart 1500 for processing video along with page parameters according to the disclosed embodiments. Flowchart 1500 may execute in conjunction with flowchart 1400. Steps 1418-1424 and 1426 of FIG. 14 are shown for illustrative purposes to show where steps 1502 and 1504 are executes. Steps 1418-1424 and 1426 are disclosed above and not repeated here.

After the page substream is created for the video print job stream, step 1502 executes by determining whether page specific parameters are to be generated for the page substream. If yes, then step 1504 executes by prepending, or wrapping, the page specific parameters to the generated page video data. The page specific parameters may serve as instructions to RIP firmware 1190. Examples of page specific parameters are disclosed above. Flowchart 1500 then proceeds to step 1426. If step 1502 is no, then flowchart 1500 goes to step 1426.

Figure 16:
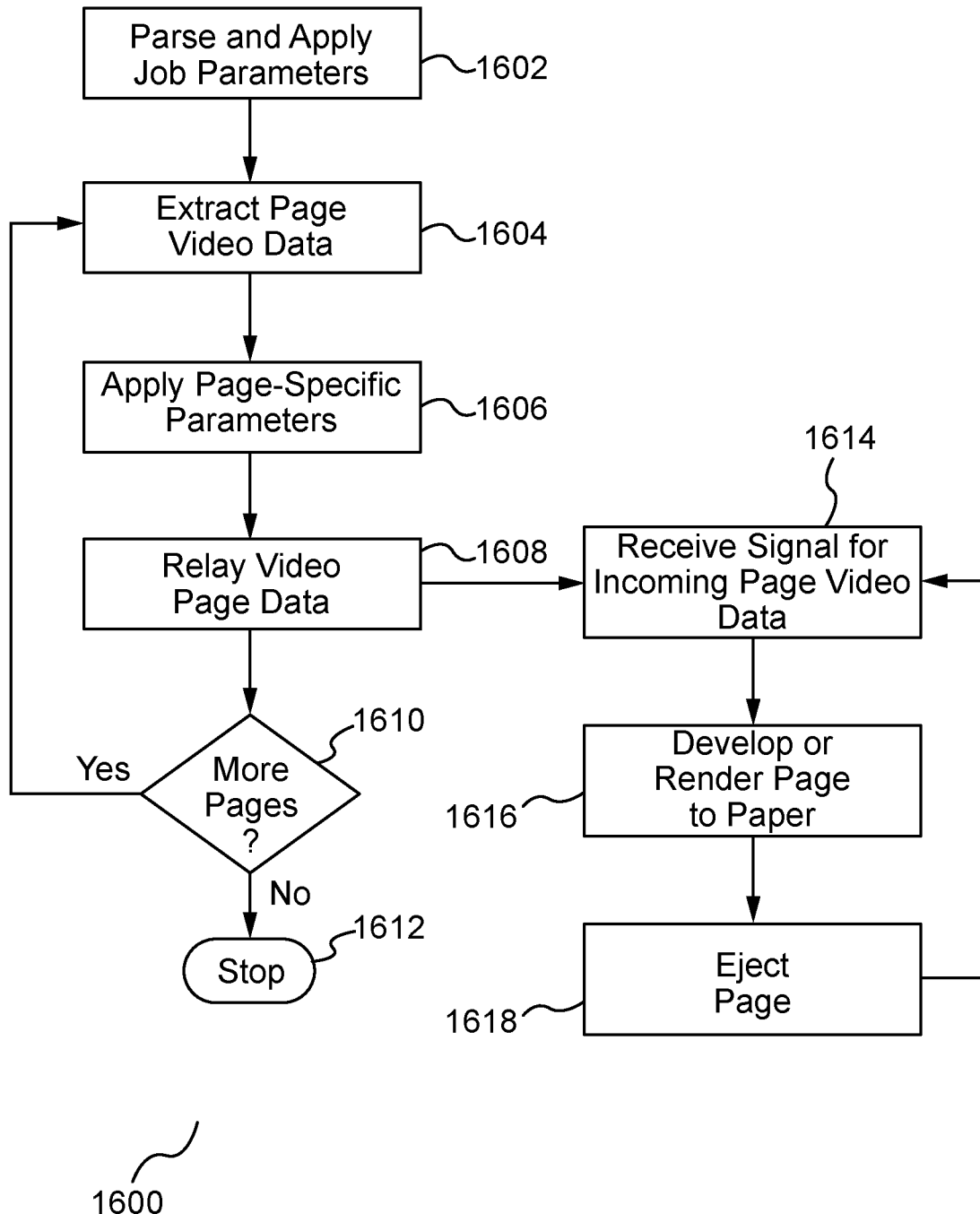
FIG. 16 illustrates a flowchart for processing a video print job received from the printcast device according to the disclosed embodiments.

FIG. 16 depicts flowchart 1600 for processing a video print job 1306 received from device 102 according to the disclosed embodiments. For flowchart 1600, print job 1306 may begin after step 1438 of flowchart 1400. Print job 1306 may be received at RIP firmware 1190 through fast data transfer port 1204. As disclosed above, print job 1306 is a video print job. The disclosed process will know how to extract the page video data for sending the video data to video developer 1104.

Step 1602 executes by parsing and applying the job parameters for the video print job. RIP firmware 1190 detects the type of incoming printable data. The video print job may include the prepended job parameters disclosed above that inform RIP firmware 1190 of the applicable format. RIP firmware 1190 may parse, record, and apply the job parameters such as paper selection, folding, stapling, punch holes, and the like.

Step 1604 executes by extracting the page video data from print job 1306. Step 1606 executes by apply any page-specific parameters, as disclosed above. Step 1608 executes by applying video page data.

Flowchart 1600 now proceeds to step 1614, which is executed using video developer 1104. In some embodiments, video developer 1104 may receive print job 1306 directly from device 102. Thus, step 1614 executes by receiving a signal for incoming page video data. Step 1616 executes by developing or rendering the video data to paper, using processes disclosed above. Step 1618 executes by ejecting the page.

Returning back to step 1608, while the page is being rendered and printed, flowchart 1600 also executes step 1610, which determines whether there are more pages to process. If yes, then flowchart 1600 returns to step 1604 to extract the next page video data. If step 1610 is no, then the processing stops and MFP 1100 waits for the next print job.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A printing computing device for printing documents from an external device at a printing device attached to a network, the printing computing device comprising:
    a print job manager to schedule a print job received over the network;
    an engine to determine whether the print job includes a printcast command or a page description language (PDL) print job;
    a raster image processing (RIP) firmware to process the PDL print job from the print job manager; and
    a communication layer to interface with the external device and the printing device; and
    a fast data transfer connector having a high-definition multimedia interface (HDMI) tip to directly connect the printing computing device to the printing device and to exchange data with the printing device,
    wherein the engine performs a function to execute within the printing computing device in response to the printcast command,
    wherein the printing computing device is attachable directly to the printing device via the HDMI tip, and
    wherein the printcast command is a command to cause the engine to perform a firmware upgrade of the printing device when a PDL of the print job is not supported by the firmware of the printing device.

2. The printing computing device of claim 1, further comprising a power supply.

3. The printing computing device of claim 2, further comprising connectors to connect the power supply to the printing device via the fast data transfer connector.

4. The printing computing device of claim 1, wherein the printcast command causes the engine to perform launching of at least one mobile application system service in response to the printcast command.

5. The printing computing device of claim 4, wherein the at least one mobile application system service includes a scanner application system service.

6. The printing computing device of claim 4, wherein the at least one mobile application system service includes a document converter application system service.

7. The printing computing device of claim 1, further comprising a memory to store a document received over the network.

8. A method for processing a print job at a printing computing device for a printing device, wherein the printing computing device is connected to an external device through a network, the method comprising:
   determining whether a print job received from the external device includes a page description language (PDL) print job or a printcast command using an engine;
   performing a function to execute within the printing computing device using the engine in response to the printcast command;
   processing the PDL print job using a raster image processing (RIP) firmware and a print job manager; and
   sending a result of the performing step or the processing step to the printing device using a fast data transfer connector having a high-definition multimedia interface (HDMI) tip that directly connects the printing computing device to the printing device,
   wherein the printing computing device is detachable from the printing device via the HDMI tip, and
   wherein the printcast command is a command to cause the engine to perform a firmware upgrade of the printing device when a PDL of the print job is not supported by the firmware of the printing device.

9. The method of claim 8, wherein determining includes analyzing a header of the print job to determine whether it is the printcast command.

10. The method of claim 8, further comprising obtaining an upgrade for the firmware from a source over the network, wherein the upgrade is the result sent to the printing device.

11. The method of claim 10, wherein obtaining the upgrade includes identifying a path for the upgrade using the printcast command.

12. The method of claim 8, wherein performing the function includes performing a scanner application system service within the printing computing device to send a scanned document to the printing device.

13. The method of claim 8, wherein performing the function includes performing a document converter application system service within the printing computing device to send a converted document to the printing device using the fast data transfer connector.

14. A method for using a printing computing device with a printing device in a network having an external device to send print jobs to the printing device, the method comprising:
   receiving a print job at a print job manager within the printing computing device;
   analyzing a header of the print job using an engine when scheduled by the print job manager;
   determining whether the print job includes a printcast command according to the header;
   processing the printcast command to determine a function to execute within the printing computing device;
   performing the function within the printing computing device to generate a result; and
   sending the result to the printing device from the printing computing device using a fast data transfer connector having a high-definition multimedia interface (HDMI) tip that directly connects the printing computing device to the printing device, wherein the result causes the printing device to print a document or upgrade firmware within the printing device
   wherein the printing computing device is a portable device that is attachable directly to the printing device via the HDMI tip, and
   wherein the printcast command is a command to cause the engine to perform the firmware upgrade of the printing device when a PDL of the print job is not supported by the firmware of the printing device.

15. The method of claim 14, wherein performing the function comprises obtaining an upgrade for the firmware within the printing device.

16. The method of claim 14, wherein performing the function comprises performing a scanner application system service on a scanned document from the external device, such that the scanned document is the result sent to the printing device using the fast data transfer connector.

17. The method of claim 14, wherein performing the function comprises performing a document converter application system service on a received document from the external device, such that the converted document is the result sent to the printing device using the fast data transfer connector.

18. The method of claim 14, further comprising querying the printing device by the printing computing device whether a page description language (PDL) is supported by the firmware in the printing device.

* * * * *